(12) United States Patent
Wifvesson et al.

(10) Patent No.: US 12,058,515 B2
(45) Date of Patent: Aug. 6, 2024

(54) USER PLANE INTEGRITY PROTECTION IN 4G SYSTEM

(71) Applicant: Telefonaktiebolaget LM Ericsson (publ), Stockholm (SE)

(72) Inventors: Monica Wifvesson, Lund (SE); Noamen Ben Henda, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 208 days.

(21) Appl. No.: 17/607,069

(22) PCT Filed: Apr. 27, 2020

(86) PCT No.: PCT/EP2020/061610
§ 371 (c)(1),
(2) Date: Oct. 28, 2021

(87) PCT Pub. No.: WO2020/221687
PCT Pub. Date: Nov. 5, 2020

(65) Prior Publication Data
US 2022/0191687 A1    Jun. 16, 2022

Related U.S. Application Data

(60) Provisional application No. 62/840,320, filed on Apr. 29, 2019.

(51) Int. Cl.
*H04L 29/06*    (2006.01)
*H04L 9/40*    (2022.01)
(Continued)

(52) U.S. Cl.
CPC ........... *H04W 12/03* (2021.01); *H04L 63/205* (2013.01); *H04W 12/106* (2021.01); *H04W 60/00* (2013.01); *H04W 76/10* (2018.02)

(58) Field of Classification Search
CPC ... H04W 12/03; H04W 12/106; H04W 60/00; H04W 76/10; H04W 12/033;
(Continued)

(56) References Cited

U.S. PATENT DOCUMENTS

2016/0286449 A1    9/2016 Choi et al.
2018/0199241 A1    7/2018 Xu et al.
(Continued)

FOREIGN PATENT DOCUMENTS

CN    105210416 A    12/2015
CN    107710809 A    2/2018
(Continued)

OTHER PUBLICATIONS

Adnan Aijaz; "Packet Duplication in Dual Connectivity Enabled 5G Wireless Networks: Overview and Challenges"; IEEE Communications Standards Magazine; Year: Sep. 2019; vol. 3, Issue 3; Publisher IEEE; pp. 20-28 (Year: 2019).*
(Continued)

*Primary Examiner* — Fatoumata Traore
*Assistant Examiner* — Courtney D Fields

(57) ABSTRACT

A method performed by a user equipment, UE, for enabling a user plane integrity protection mode in a radio access network packet data convergence protocol, PDCP, is provided. The method includes providing an indication of a user plane integrity protection, UP IP, mode supported by the UE. The method further includes receiving an activation message from a receiving node that includes an indication to the UE to activate the UP IP mode. The receiving node is a long term evolution eNodeB. Methods performed by a network node and a radio access node are also provided.

31 Claims, 32 Drawing Sheets

(51) Int. Cl.
　　*H04W 12/03* (2021.01)
　　*H04W 12/04* (2021.01)
　　*H04W 12/106* (2021.01)
　　*H04W 60/00* (2009.01)
　　*H04W 76/10* (2018.01)
　　*H04W 36/00* (2009.01)
　　*H04W 76/15* (2018.01)

(58) Field of Classification Search
　　CPC .... H04W 76/12; H04W 76/15; H04L 63/205; H04L 63/123
　　See application file for complete search history.

(56) References Cited

U.S. PATENT DOCUMENTS

| | | |
|---|---|---|
| 2018/0270668 A1 | 9/2018 | Nair |
| 2018/0352448 A1 | 12/2018 | Ryu et al. |
| 2019/0053118 A1* | 2/2019 | Hahn .................. H04W 76/30 |
| 2019/0246282 A1 | 8/2019 | Li et al. |
| 2021/0127272 A1 | 4/2021 | Zhao et al. |

FOREIGN PATENT DOCUMENTS

| | | | | |
|---|---|---|---|---|
| CN | 108702673 A | 10/2018 | | |
| EP | 3860085 A1 * | 8/2021 | ........... | H04L 63/123 |
| JP | 2020-519190 A | 6/2020 | | |
| JP | 2021-532658 A | 11/2021 | | |
| WO | 2017138977 A1 | 8/2017 | | |
| WO | 2018138379 A1 | 8/2018 | | |
| WO | WO-2018138379 A1 * | 8/2018 | ............ | H04L 29/06 |
| WO | 2018-201630 A1 | 11/2018 | | |
| WO | 2020-029734 A1 | 2/2020 | | |
| WO | WO-2020064387 A1 * | 4/2020 | ............ | H04L 29/06 |
| WO | 2020091056 A1 | 5/2020 | | |

OTHER PUBLICATIONS

Office Action for Chinese Patent Application No. 202080043316.2 dated Feb. 28, 2023, 13 pages.

International Search Report and Written Opinion of the International Searching Authority for PCT International Application No. PCT/EP2020/061610 dated Jul. 28, 2020.
3GPP TS 33.501 V15.4.0, "3rd Generation Partnership Project; Technical Specification Group Services and System Aspects; Security architecture and procedures for 5G system (Release 15)," Mar. 2019, 187 pages.
3GPP TS 23.501 V15.5.0, "3rd Generation Partnership Project; Technical Specification Group Services and System Aspects; System Architecture for the 5G System; Stage 2 (Release 15)," Mar. 2019, 241 pages.
3GPP TS 23.401 V15.7.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)," Mar. 2019, 411 pages.
3GPP TS 33.501 V15.3.1, "3rd Generation Partnership Project; Technical Specification Group Services and System Aspects; Security architecture and procedures for 5G system (Release 15)," Dec. 2018, 181 pages.
3GPP TR 33.853 V1.0.0, "3rd Generation Partnership Project; Technical Specification Group Services and System Aspects; Key issues and potential solutions for integrity protection of the user plane; (Release 16)", Jun. 2020, 39 pages.
3GPP TS 33.501 V16.3.0, "3rd Generation Partnership Project; Technical Specification Group Services and System Aspects; Security architecture and procedures for 5G system (Release 16)", Jul. 2020, 248 pages.
Ericsson, "UPIP: New solution for interworking handover from EPS to 5GS", S3-203379, 3GPP TSG-SA3 Meeting #101-e, e-meeting, Nov. 9-20, 2020, 4 pages.
Office Action (Notice of Reasons for Rejection) for Japanese Patent Application No. 2021-563599, including English translation, dated Jan. 10, 2023.
Vodafone, "3rd Generation Partnership Project; Technical Specification Group Services and System Aspects; Technical report on key issues and potential solutions for Integrity protection of the User Plane; (Release 16)" [online], 3GPP TR33.853 V0.2.0, https://www.3gpp.org/ftp/tsg_sa/WG3_Security/TSGS3_94AH_Kista/Docs/S3-190910.zip, Mar. 18, 2019.

* cited by examiner

```
┌─────────────────────────────────────────────────────────────┐
│ Receive message from core node that includes indication of user │──── 3400
│ plane integrity protection mode supported by UE             │
└─────────────────────────────────────────────────────────────┘
```

Figure 34

```
┌─────────────────────────────────────────────────────────────┐
│ Receive attach request that includes indication of UP IP mode and │──── 3500
│ includes default bearer setup                               │
└─────────────────────────────────────────────────────────────┘
                              │
                              ▼
┌─────────────────────────────────────────────────────────────┐
│ Establish secure connection between UE and radio access network │──── 3502
└─────────────────────────────────────────────────────────────┘
                              │
                              ▼
┌─────────────────────────────────────────────────────────────┐
│ Send message to long term evolution e Node B that includes  │──── 3504
│ indication of the UP IP mode                                │
└─────────────────────────────────────────────────────────────┘
```

Figure 35

```
┌─────────────────────────────────────────────────────────────┐
│ Receiving UP IP Mode during security mode command procedure │──── 3600
└─────────────────────────────────────────────────────────────┘
```

Figure 36

```
┌─────────────────────────────────────────────────────────────┐
│ Send message to UE that includes indication to UE to activate the │──── 3700
│ UP IP mode                                                  │
└─────────────────────────────────────────────────────────────┘
```

Figure 37

USER PLANE INTEGRITY PROTECTION IN 4G SYSTEM

CROSS REFERENCE TO RELATED APPLICATIONS

This application is a 35 U.S.C. § 371 national stage application of PCT International Application No. PCT/EP2020/0561610 filed on Ap. 27, 2020, which claims the benefit of U.S. Provisional Patent Application Ser. No. 62/840,320, filed on Apr. 29, 2019, the disclosures and content of which are incorporated by reference herein in their entireties.

TECHNICAL FIELD

The present disclosure relates generally to wireless communications systems and, more particularly user plane integrity protection in a wireless network.

BACKGROUND

The 3GPP TS 23.401 describes the 4G network architecture. A stripped down simplified version of a 4G network is shown in FIG. 1 where a single eNB LTE (eNodeB Long Term Evolution) is connected to a Mobility Management (MME) node—referred to herein as Option 1. Dual Connectivity with Option 1—is shown in FIG. 2 where two LTE eNB's are acting as Master Node and Secondary Node.

A UE (User Equipment) is a mobile device used by a user to wirelessly access the network. The radio access network (RAN) function or base station, e.g. LTE eNB (4G node B), is responsible for providing wireless radio communication to the UE and connecting the UE to the core network. A core network function, e.g. MMF (Mobility Management Function), is responsible for handling the mobility of the UE, among other responsibilities, and also handling the session and traffic steering of the UE, among other responsibilities. Another core network function, e.g. SGW (Serving Gateway Function), is responsible for interconnecting to a data network vis a Packet Data Network (PDN), packet routing and forwarding, among other responsibilities.

The UE interacts with the LTE eNB over-the-air using radio interface. The radio interface traffic includes control plane traffic and user plane traffic. The radio control plane is also called RRC (Radio Resource Control). The LTE eNB in turn may interact with the MMF using an S1-MME interface. Similarly, an LTE eNB and an SGW may interact using an S1-U interface as illustrated in FIG. 1 (which illustrates a simplified 4G network where a single LTE eNB is connected to an MME—referred to herein as Option 1).

SUMMARY

According to some embodiments of the present disclosure, a method performed by a user equipment, UE, for enabling a user plane integrity protection mode in a radio access network packet data convergence protocol, PDCP is provided. The method includes providing an indication of a user plane integrity protection, UP IP, mode supported by the UE. The method further includes receiving an activation message from a receiving node that includes an indication to the UE to activate the UP IP mode. The receiving node is a long term evolution eNodeB.

In some embodiments of the present disclosure, the method further includes sending an attach request to a core node that includes the indication of the UP IP mode supported by the UE.

In some embodiments of the present disclosure, sending the attach request does not include a default radio bearer setup and the method further includes receiving a message from a receiving node to initiate a security mode procedure with the UE where no data radio bearer with the UE is established.

In some embodiments of the present disclosure, the method further includes establishing a secure packet data network connection with a core node to establish a data radio bearer with the network. The method further includes receiving a message from the receiving node that includes an indication to the UE to activate the UP IP mode for the data radio bearer established with the receiving node.

In some embodiments of the present disclosure, the method further includes receiving a handover command message from the long term evolution eNode B that includes an indication to the UE to activate the user plane integrity protection for a data radio bearer established with a new radio access node.

In some embodiments of the present disclosure, the method further includes establishing a secure network connection with a core node. The method further includes receiving a message from the long term evolution eNode B that includes an indication to the UE to activate the UP IP mode for the data radio bearer established with the long term evolution eNode B.

In some embodiments of the present disclosure, the method further includes sending an attach request to a target core node that includes the indication of the UP IP mode supported by the UE. The method further includes, if the attach request was not successfully integrity protected, receiving a request from the target core node to resend the attach request that includes the indication of the UP IP mode supported by the UE.

In some embodiments of the present disclosure, the method further includes receiving a handover command from a source radio access node. The handover command includes a command to the UE to activate the UP IP mode for a data radio bearer established with a target radio access node.

In some embodiments of the present disclosure, the method further includes receiving a reconfiguration request from a master radio access node. The reconfiguration request includes an indication to the UE to activate the UP IP mode for a data radio bearer established with a secondary radio access node. The method further includes activating the UP IP mode for the data radio bearer established with the secondary radio access node.

In other embodiments of the present disclosure, a method performed by a network node for enabling a user plane integrity protection mode in a radio access network packet data convergence protocol, PDCP, is provided. The method includes handling an indication of a user plane integrity protection mode supported by a user equipment, UE.

In some embodiments of the present disclosure, the method performed by a network node further includes receiving a packet data network connection establishment request from the UE to establish a data bearer with the radio access network. The method further includes creating a session with the gateway node to establish the default bearer with the UE. The method further includes, responsive to establishing the default bearer, sending a message to a long term evolution eNodeB that includes the indication of the UP IP mode supported by the UE.

In some embodiments of the present disclosure, in the method performed by a network node the UP IP mode is one of (1) the UE supports user plane integrity protection in new radio PDCP with a gNB in a 4G network at a full data rate and (2) the UE supports user plane integrity protection at a defined rate that is less than the full data rate with a gNB in a 4G network; and the method further includes establishing a secure packet data network connection with the UE to establish a data radio bearer with the radio access network. The method further includes creating a session procedure with a gateway node to establish a default bearer with the UE. The method further includes initiating a context setup procedure with the receiving node that includes the indication of the UP IP mode supported by the UE.

In some embodiments of the present disclosure, the method performed by a network node further includes requesting a location update from a core network server. The method further includes receiving from the core network server a location update response message that includes subscription data information for the UE as the user plane integrity protection policy. The method further includes storing the user plane integrity protection policy in the network node. The method further includes deciding that the user plane integrity protection policy takes precedence over the indication of the UP IP mode received in the attach request. The method further includes creating a session procedure with the core network to establish a default bearer with the UE. The method further includes sending a message to a long term evolution eNode B that includes the UP IP mode for the UE and the user plane integrity protection policy.

In some embodiments of the present disclosure, the method performed by a network node further includes sending a message to a source core node that includes the complete attach request. The method further includes receiving a response to the message. The response provides the UP IP mode of the UE to the target core node when the attach request is successfully authenticated. The method further includes, if the attach request was not successfully integrity protected, sending a request to the UE to resend the attach request that includes the indication of the UP IP mode supported by the UE.

In some embodiments of the present disclosure, the method performed by a network node further includes receiving a handover request from a source node. The method further includes forwarding (1) the handover request to a source core node and (2) the UP IP mode for the UE if the UP IP mode for the UE is stored in the target core node. The method further includes sending a handover command request to a target node, wherein the handover command request includes the UP IP mode if it is stored in the target core node. The method further includes sending the UP IP mode to the source node.

According to other embodiments of the present disclosure, a method performed by a radio access node for enabling a user plane integrity protection mode in a radio access network packet data convergence protocol, PDCP, is provided. The method includes receiving a message from a network node that includes an indication of the user plane integrity protection, UP IP, mode supported by a user equipment, UE. The radio access node is a long term evolution eNodeB. The method further includes sending a message to the UE that includes an indication to the UE to activate the UP IP mode.

In some embodiments of the present disclosure, the method performed by a radio access node further includes, if the UP IP mode is received from the core node, indicating to a new radio access node that the new radio access node should activate the UP IP mode for a data radio bearer established with the UE. The method further includes sending a request to the new radio access node for the new radio access node to activate the UP IP mode for the data radio bearer established with the UE. The method further includes receiving a response from the new radio access node that indicates that the UP IP mode for the data radio bearer established with the UE will be activated. The method further includes initiating a reconfiguration procedure with the UE that includes indicating to the UE to activate the UP IP mode for the data radio bearer established with the new radio access node.

In some embodiments of the present disclosure, the method performed by a radio access node further includes determining a UP IP mode based on if the radio access node receives a user plane integrity protection policy from the core node that indicates that UP IP mode for the data radio bearer should be activated. The method further includes, responsive to receipt of the policy indicating that UP IP mode should be activated, activating the UP IP mode for the data radio bearer.

In some embodiments of the present disclosure, the method performed by a radio access node further includes providing the received user plane integrity protection policy to the new radio access node.

In some embodiments of the present disclosure, the method performed by a radio access node further includes deciding from the UP IP mode together with the user plane integrity protection policy whether the UP IP mode for a data radio bearer should be activated. The method further includes sending the decision to the new radio access node.

Corresponding embodiments of inventive concepts for a UE, a network node, a radio access node, computer products, and computer programs are also provided.

The following explanation of potential problems with existing solutions is a present realization as part of the present disclosure and is not to be construed as previously known by others. There is no support for the integrity protection of user plane in LTE. Therefore, a UE may not be enabled to use user plane integrity protection in PDCP with a Rel-16 LTE eNB or a Rel-16 g-eNB.

In various embodiments of the present disclosure, a UE is enabled to use user plane integrity protection in PDCP with a Rel-16 LTE eNB or a Rel-16 g-eNB. As a consequence, an advantage of enabled UP IP may be to protect user plane traffic sent in LTE PDCP between a Rel-16 UE and a Rel-16 LTE eNB. This also may apply to Dual Connectivity where a first and a second LTE eNB may be act as a Master Node and as a Secondary Node in Dual Connectivity. Further potential advantages of enabled UP IP may be to protect user plane traffic sent in NR PDCP between a Rel-16 UE and a Rel-16 gNB acting as a Secondary Node in Enhanced Dual Connectivity in Option 3; and to control the UP IP by having a policy for UP integrity protection and assigning the policy to LTE eNB.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 26-33 and 35 are flowcharts of operations that may be performed by a network node, in accordance with some embodiments of the present disclosure;

FIGS. 34 and 36-41 are flowcharts of operations that may be performed by a radio access node, in accordance with some embodiments of the present disclosure;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," or "user equipment (UE)."

Figure 1:
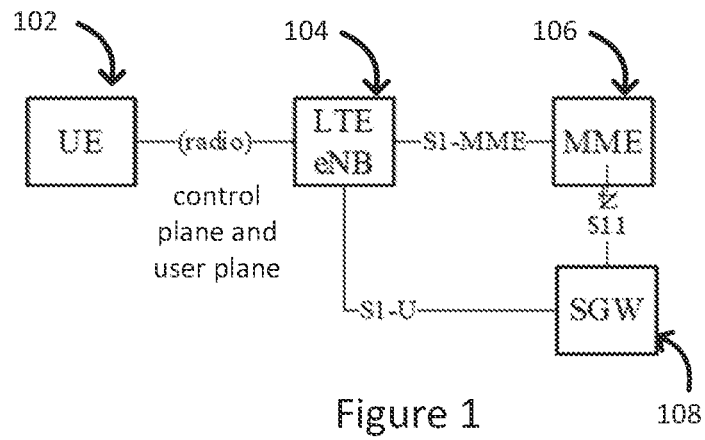
FIG. 1 illustrates a simplified 4G network where a single LTE eNB is connected to an MME.
Figure 2:
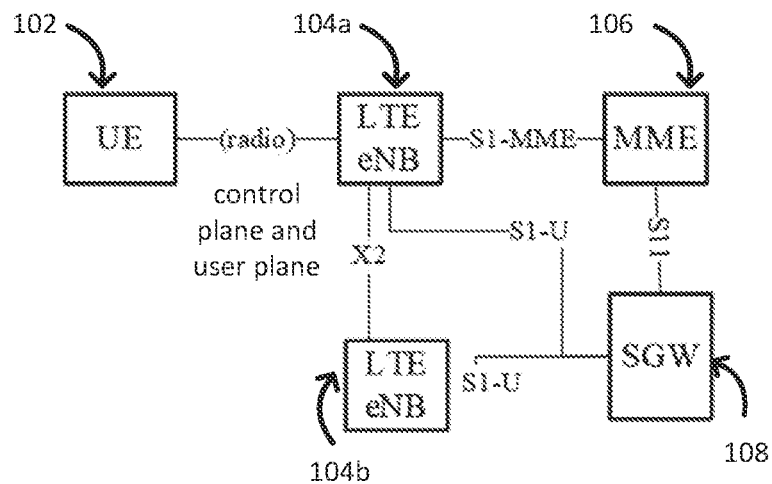
FIG. 2 illustrates a simplified 4G network with dual connectivity.

In a DC (Dual Connectivity) approach, a first LTE eNB may act as a Master Node and a second LTE eNB may act as a Secondary Node. The two LTE eNB's may be connected via the X2 interface. Only the first LTE eNB acting as Master Node is connected to the MME via S1-MME interface as illustrated, for example, in FIG. 2 (which is a simplified version of a 4G network with dual connectivity—referred to herein as Option 1 with dual connectivity).

Figure 3:
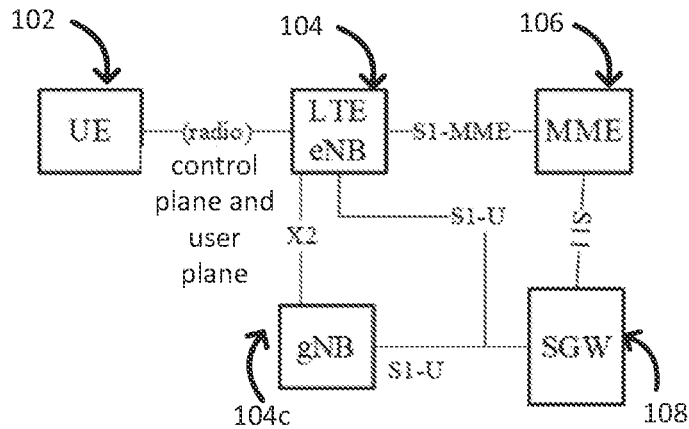
FIG. 3 illustrates a simplified 4G network with enhanced dual connectivity (EN-DC)

In another approach, a radio access node (RAN) in 5G (called NG-RAN) has another type of base station called gNB (g Node B or new radio access node). In EN-DC (Enhanced Dual Connectivity) in Option 3, the gNB may act as a secondary node in Dual Connectivity. The gNB may be connected to a LTE eNB acting as a master node in Dual Connectivity. The gNB may be connected to the LTE eNB via the X2 interface as shown, for example in FIG. 3 (which is a simplified version of a 4G network with enhanced dual connectivity—referred to herein as Option 3).

The logical aspects between the UE and the MMF may be referred to as NAS (non-access stratum); and the logical aspects between the UE and the LTE eNB may be referred to as AS (access stratum). Correspondingly, the security of communication (control plane and user plane, if applicable) may be referred to as NAS security and AS security, respectively.

The AS security may include confidentiality and integrity protection of the control plane (e.g., the RRC) and the user plane traffic. Radio bearers in AS that carry control plane or RRC messages may be referred to as a signaling data bearer (SRB). Similarly, radio bearers in AS that carry user plane messages may be referred to as a data bearer (DRB).

In an LTE system (Long Term Evolution, which is popularly known as 4G), AS security may be mandatory for both the RRC and the user plane; which may mean that both confidentiality and integrity protection are activated for the RRC and confidentiality is activated for the user plane. There is no support for integrity protection of the user plane in LTE. While there are null-encryption and null-integrity algorithms in LTE, null-encryption and null-integrity algorithms in LTE do not encrypt and integrity protect the RRC or user plane traffic. Because these null algorithms are a type of algorithm, AS security may be said to be activated, e.g., activated using null algorithms.

In an LTE system (Long Term Evolution, which is popularly known as 4G), the AS security is mandatory for both the RRC and the user plane; which may mean that both confidentiality and integrity protection are activated for the RRC and confidentiality is activated for the user plane.

In a first approach, there may be no support for the integrity protection of a user plane in LTE PDCP in Rel-15 UE and in a Rel-15 LTE eNB in Option 1, Option 1 with Dual connectivity and Option 3 with Enhanced Dual Connectivity.

In a second approach, integrity protection of a user plane in new radio (NR) PDCP in a Rel-15 UE and in a Rel-15 gNB acting as Secondary Node in Enhanced Dual Connectivity (EN-DC) in Option 3, is not enabled in Re-15.

Even if a UE Rel-15 supports EN-DC and supports UP IP in NR PDCP with a gNB as a secondary gNB in EN-DC, the UE Rel-15 may not be able to simply switch on UP IP in NR PDCP when communicating with a SgNB in EN-DC if it communicates with a Rel16 MME/Rel-16 RAN because Rel-15 UE vendors may not have not been able to test UP IP in NR PDCP in their Rel-15 UE's in real and live Rel-15 networks.

In a third approach, in legacy 4G networks, an LTE eNB may be configured locally with a policy whether user plane encryption should be enabled or not for user plane traffic in LTE PDCP protocol between a UE and a LTE eNB. A MME may have no control of the user plane policy for encryption in this respect.

In some embodiments of inventive concepts, a Core Network (CN) controlled policy for UP integrity protection may be used.

In various embodiments of inventive concepts, in a 4G system, use plane integrity protection (UP IP) may be enabled for data sent in LTE PDCP in a Rel-16 UE and in a Rel-16 LTE eNB in Option 1, and in Option 1 with Dual Connectivity where a first Rel-16 LTE eNB may act as a Master Node and a second Rel-16 LTE eNB may act as a Secondary Node.

In some embodiments of inventive concepts, user plane integrity protection (UP IP) may be enabled in NR PDCP in a Rel-16 UE and in a Rel-16 gNB acting as a Secondary Node in Enhanced Dual Connectivity in Option 3.

In other embodiments in a 4G system, a CN controlled policy for UP integrity protection may be enabled.

As used herein, reference to a long term evolution eNode B includes, e.g., an LTE eNB (also referred to as a 4G Node B). As used herein, reference to a next generation radio access node includes, e. g., a gNB (also referred to as a 5G Node B or a new radio access node). As used herein, reference to an evolved long term radio access node includes, e.g. an E-UTRA node (also referred to as a ng-eNB or a Next Generation Evolved Node-B as referenced, e.g., in 3GPP TS 33.501). An ng-eNB is an enhanced LTE/4G eNB that connects to a 5G Core Network via NG interfaces but still uses LTE/4G air interfaces to communicate with a 5G UE.

In various embodiments of inventive concepts, an advantage of enabled UP IP may be to protect user plane traffic sent in LTE PDCP between a Rel-16 UE and a Rel-16 LTE eNB. This also applies to Dual Connectivity where a first and a second LTE eNB may be act as a Master Node and as a Secondary Node in Dual Connectivity.

In various embodiments of inventive concepts, a further advantage of enabled UP IP may be to protect user plane traffic sent in NR PDCP between a Rel-16 UE and a Rel-16 gNB acting as a Secondary Node in Enhanced Dual Connectivity in Option 3.

In various embodiments of inventive concepts, a further advantage of enabled UP IP may be for a Core Network to control the UP IP by having a policy for UP integrity protection and assigning the policy to LTE eNB.

In various embodiments of inventive concepts, an indication of a UP IP mode supported by a UE, for example: UE_UP_IP_LTE_ENB may be provided. The UP IP mode may include that:
 the UE supports user plane integrity protection in PDCP with a radio access node at a full data rate;
 the UE supports user plane integrity protection in PDCP with the radio access node at a defined data rate that is less than the full data rate;
 the UE supports user plane integrity protection in new radio PDCP with a gNB in a 4G network at a full data rate, and/or
 the UE supports user plane integrity protection at a defined rate that is less than the full data rate with a gNB in a 4G network.

Figure 4:
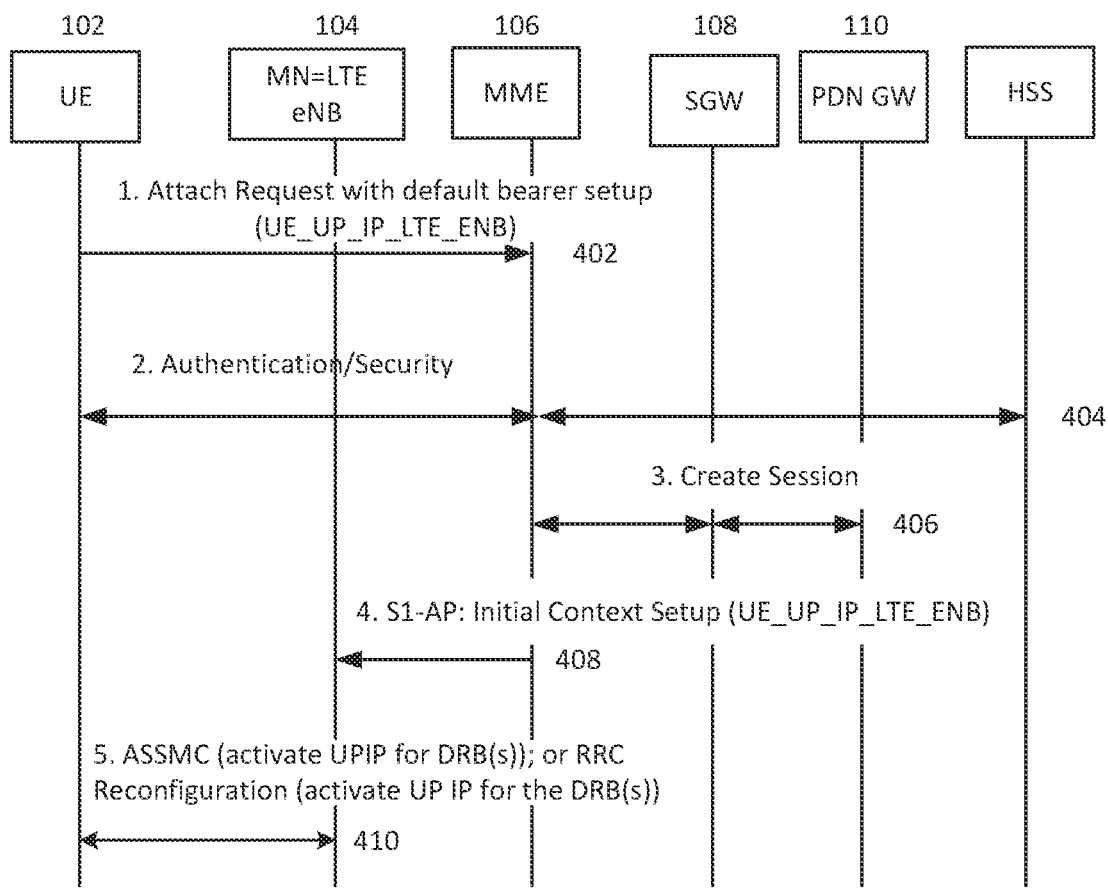
FIG. 4 illustrates operations to configure network devices during an attach request with default bearer setup, in accordance with some embodiments of the present disclosure.

In one embodiment of inventive concepts, UP IP may be enabled during, e.g., an attach request with default bearer setup as illustrated in FIG. 4. FIG. 4 illustrates operations to configure network devices during an attach request with default bearer setup to enable user plane integrity protection of data in a 4G network. As shown in FIG. 4, at 402, UE 102 sends mobility management node (MME) 106 an attach request that includes indicator UE_UP_IP_LTE_ENB. UE_UP_IP_LTE_ENB that indicates that UE 102 supports User Plane integrity protection in LTE PDCP. UE_UP_IP_LTE_ENB can also indicate the UE's defined data rate for UP integrity protection.

At 404, MME 106 initiates an authentication procedure and/or a NAS Security Mode Command procedure to establish security between UE 102 and MME 106.

At 406, the MME initiates a Initial Context Setup procedure with LTE eNB 104 and includes UE 102 security capability UE_UP_IP_LTE_ENB to LTE eNB 104.

At 408, LTE eNB 104 initiates a AS SMC (AS Security Mode Command) procedure with UE 102 and indicates to UE 102 to activate UP integrity protection for DRBs (data radio bearers) established with LTE eNB 104.

Figure 15:
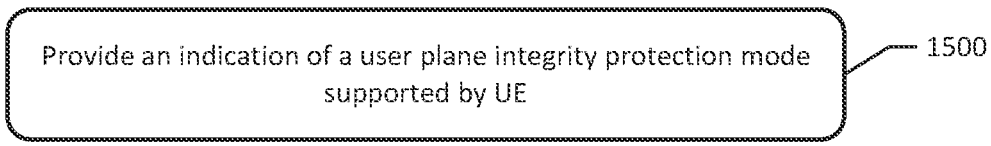
FIGS. 15-25 are flowcharts of operations that may be performed by a UE, in accordance with some embodiments of the present disclosure.
Figure 16:
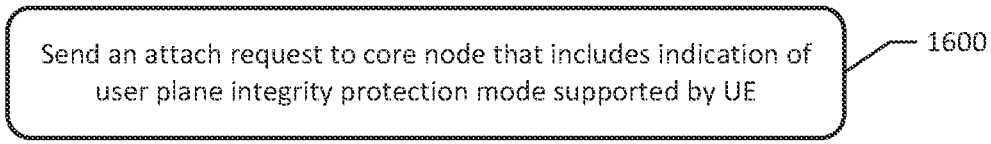
Figure 17:
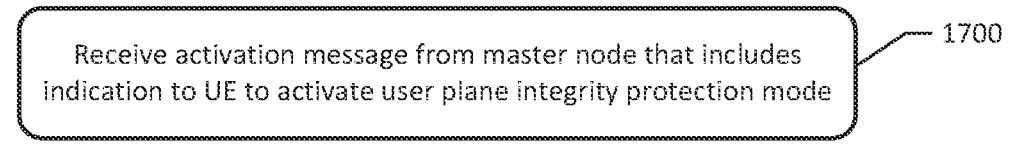
Figure 26:
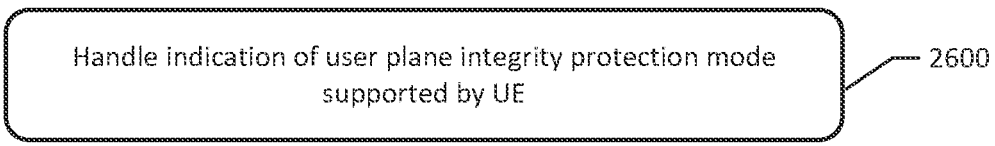

These and other related operations are now described in the context of the operational flowcharts of FIGS. 15-17, 21, 26-27, 34, and 37. FIGS. 15-17 and 21 are flowcharts of operations that can be performed by a UE. FIGS. 26 and 17 are flowcharts of operations that can be performed by a network node. FIGS. 34 and 37 are flowcharts of operations that can be performed by a radio access node.

Referring initially to FIG. 15, operations can be performed by a UE (e.g., 4400 in FIG. 44) for enabling a user plane integrity protection mode in a radio access network packet data convergence protocol (PDCP). The operations may include providing 1500 an indication of a user plane integrity protection mode supported by the UE (referred to herein as UP IP mode). The user plane integrity protection mode includes one of:

The UE supports user plane integrity protection in PDCP with a radio access node at a full data rate, and The UE supports user plane integrity protection in PDCP with the radio access node at a defined rate that is less than the full data rate.

In at least some embodiments, referring to the example embodiment of FIG. 16, the operations further include sending 1600 an attach request to a core node that includes the indication of the user plane integrity protection mode supported by the UE.

In at least some further embodiments, referring to the example embodiment of FIG. 17, the operations further include receiving 1700 an activation message from a receiving node that includes an indication to the UE to activate the user plane integrity protection mode.

Figure 21:
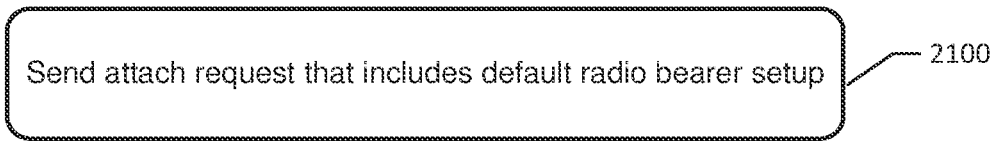

Sending the attach request further includes sending 2100 a default radio bearer setup in the attach request, as shown in FIG. 21.

Receiving the activation message further includes receiving an indication to the UE to activate the user plane integrity protection mode for a data radio bearer established with the master node.

The radio access network can be a 4G network (e.g., LTE, E-UTRA network).

The receiving node can be a long term evolution eNodeB (e.g., radio access node 4500, e-UTRA Node B, 4G Node B).

The core node can be a mobility management node (e.g., MME 4700).

Referring initially to FIG. 26, operations can be performed by a network node (e.g., 4600 in FIG. 46) for enabling a user plane integrity protection mode in a radio access network packet data convergence protocol (PDCP). The operations include handling 2600 an indication of a user plane integrity protection mode supported by a user equipment. The UP IP mode may be as described above.

Figure 27:
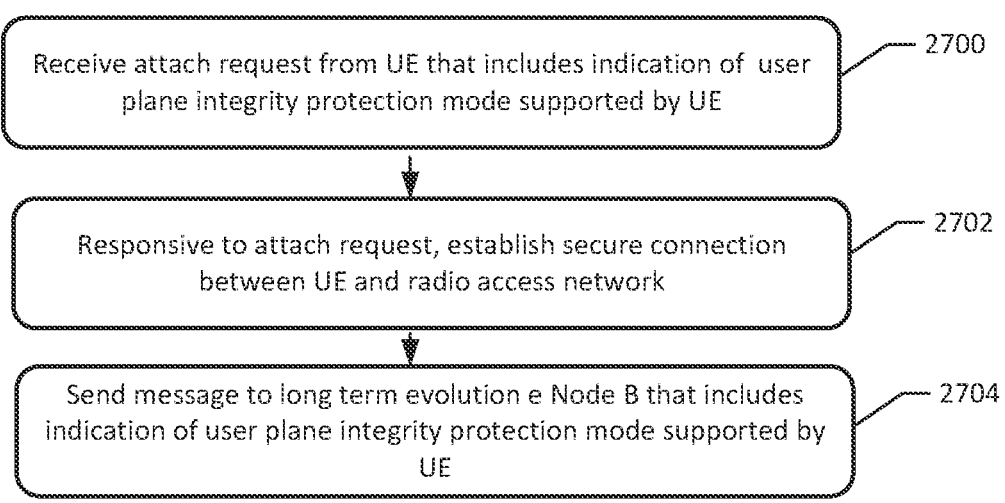

Referring to FIG. 27, the handling includes receiving 2700 an attach request from the UE that includes the indication of the user plane integrity protection mode supported by the UE. The handling further includes, responsive to the attach request, establishing 2702 a secure connection between the UE and the radio access network; and establishing 2704 a data radio bearer with the UE. The handling also includes, responsive to establishing the data radio bearer, sending 2706 a message to a long term evolution e Node B that includes the indication of the user plane integrity protection mode supported by the UE.

Receiving the attach request further receiving a default radio bearer setup in the attach request.

The radio access network can be a 4G network (e.g., LTE, E-UTRA network).

The core node can be a mobility management node (e.g., MME 4700).

The radio access node can be a long term evolution eNodeB (e.g., radio access node 4500, e-UTRA Node B, 4G Node B).

Referring initially to FIG. 34, operations can be performed by a radio access node (e.g., 4500 in FIG. 45) for enabling a user plane integrity protection mode in a radio access network PDCP. The operations include receiving 3400 a message from a core node that includes an indication of the user plane integrity protection mode supported by a UE. The UP IP mode may be as described above.

In at least some embodiments, referring to the example embodiment of FIG. 37, the operations further include sending 3700 a message to the UE that includes an indication to the UE to activate the UP IP mode.

The radio access network can be a 4G network (e.g., LTE, E-UTRA network).

The core node can be a mobility management node (e.g., MME 4700).

The radio access node can be a long term evolution eNodeB (e.g., radio access node 4500, e-UTRA Node B, 4G Node B).

Figure 5:
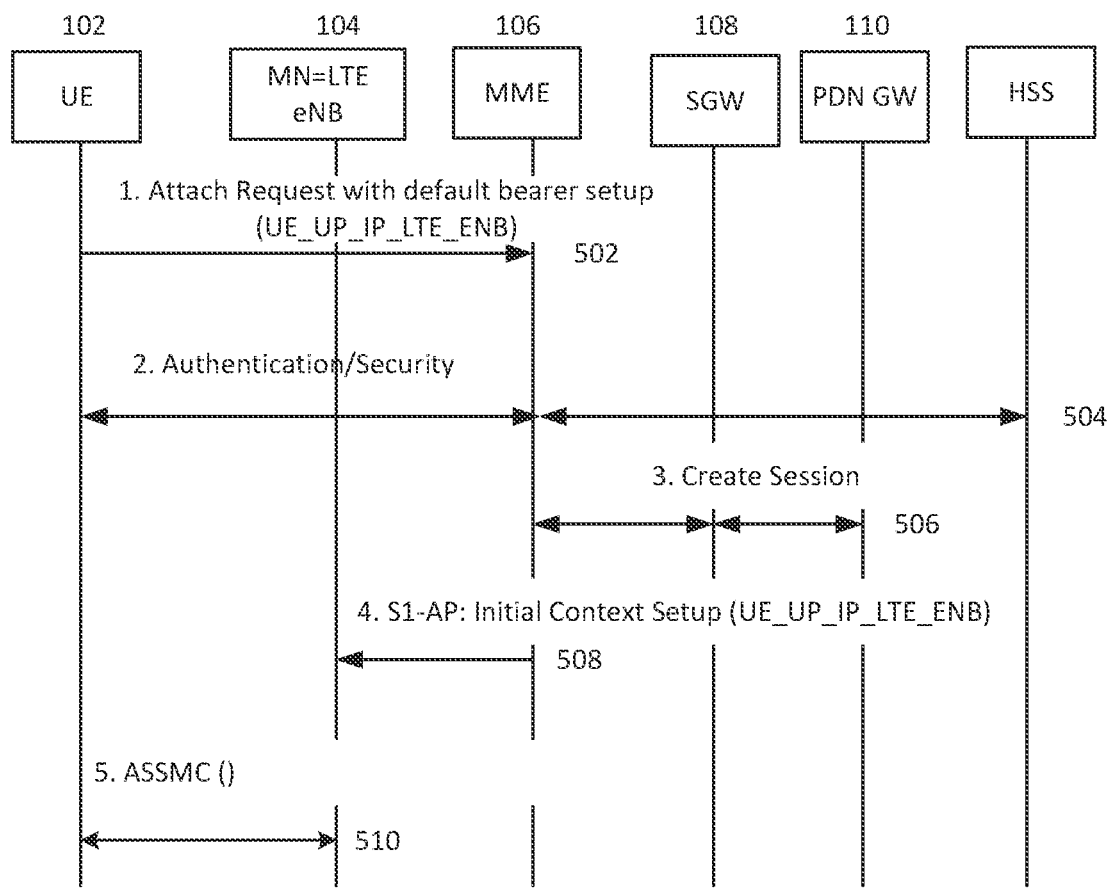
FIG. 5 illustrates operations to configure network devices during an attach request without default bearer setup, in accordance with some embodiments of the present disclosure.

In a further embodiment of inventive concepts, UP IP may be enabled during, e.g., a attach request without default bearer setup as illustrated in FIG. 5. As shown in FIG. 5, at 502, UE 102 sends an attach request to the network that includes UE 102 security capability UE_UP_IP_LTE_ENB in the Attach Request message. UE_UP_IP_LTE_ENB indicates that UE 102 supports User Plane integrity protection in LTE PDCP. UE_UP_IP_LTE_ENB may also indicate the UE's 102 full data rate for UP integrity protection.

At 504, MME 106 initiates an Authentication procedure and/or NAS Security Mode Command procedure to establish security between UE 102 and MME 106.

At 506, MME 106 initiates a Creates Session procedure to establish a default bearer with UE 102.

At 508, MME 106 initiates an Initial Context Setup procedure with LTE eNB 104 and includes UE 102 security capability UE_UP_IP_LTE_ENB to LTE eNB 104.

At 510, LTE eNB 104 initiates a AS SMC (AS Security Mode Command) procedure with UE 102. No DRB's may be established with UE 102.

Figure 29:
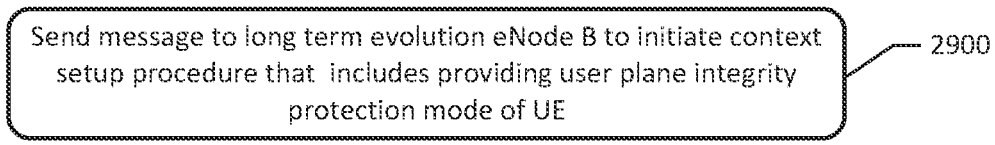

These and other related operations are now described in the context of the operational flowcharts of FIGS. 15-18, 26-27, 29, 34 and 36. FIGS. 15-18 are flowcharts of operations that can be performed by a UE. FIGS. 26-27 and 29 are flowcharts of operations that can be performed by a network node. FIGS. 34 and 36 are flowcharts of operations that can be performed by a radio access node.

Referring initially to FIGS. 15-17, operations can be performed by a UE (e.g., 4400 in FIG. 44) for enabling user plane integrity protection of data in a radio access network PDCP. The operations include the operations described above with reference to FIGS. 15-17.

Figure 18:
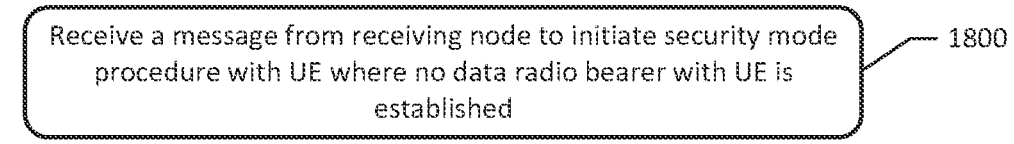

In at least some embodiments, referring to the example embodiment of FIG. 18, the operations further include receiving 1800 a message from a receiving node to initiate a security mode procedure with the UE where no data radio bearer with the UE is established.

The radio access node can be a long term evolution eNodeB (e.g., radio access node 4500, e-UTRA Node B, 4G Node B).

The core node can be a mobility management node (e.g., MME 4700).

The receiving node can be a long term evolution eNodeB (e.g., radio access node 4500, e-UTRA Node B, 4G Node B).

Referring to FIGS. 26-27, operations can be performed by a network node (e.g., 4600 in FIG. 46) for enabling a user plane integrity protection mode in a radio access network packet data convergence protocol (PDCP). The operations can include the operations described above with reference to FIGS. 26-27.

Sending the attach request may not include a default radio bearer setup in the attach request.

In at least some embodiments, referring to the example embodiment of FIG. 29, the operations further include sending 2900 a message to the long term evolution eNode B to initiate a context setup procedure with the long term evolution eNode B. The message includes providing the user plane integrity protection mode of the UE to the long term evolution eNode B.

Referring to FIGS. 34 and 36, operations can be performed by a radio access node (e.g., 4500 in FIG. 45) for enabling a user plane integrity protection mode in a radio access network packet data convergence protocol (PDCP). The operations can include the operations described above with reference to FIG. 34.

In at least some embodiments, referring to the example embodiment of FIG. 36, the operations further include initiating 3600 a security procedure with the UE when there is no data radio bearer with the UE established.

Figure 6:
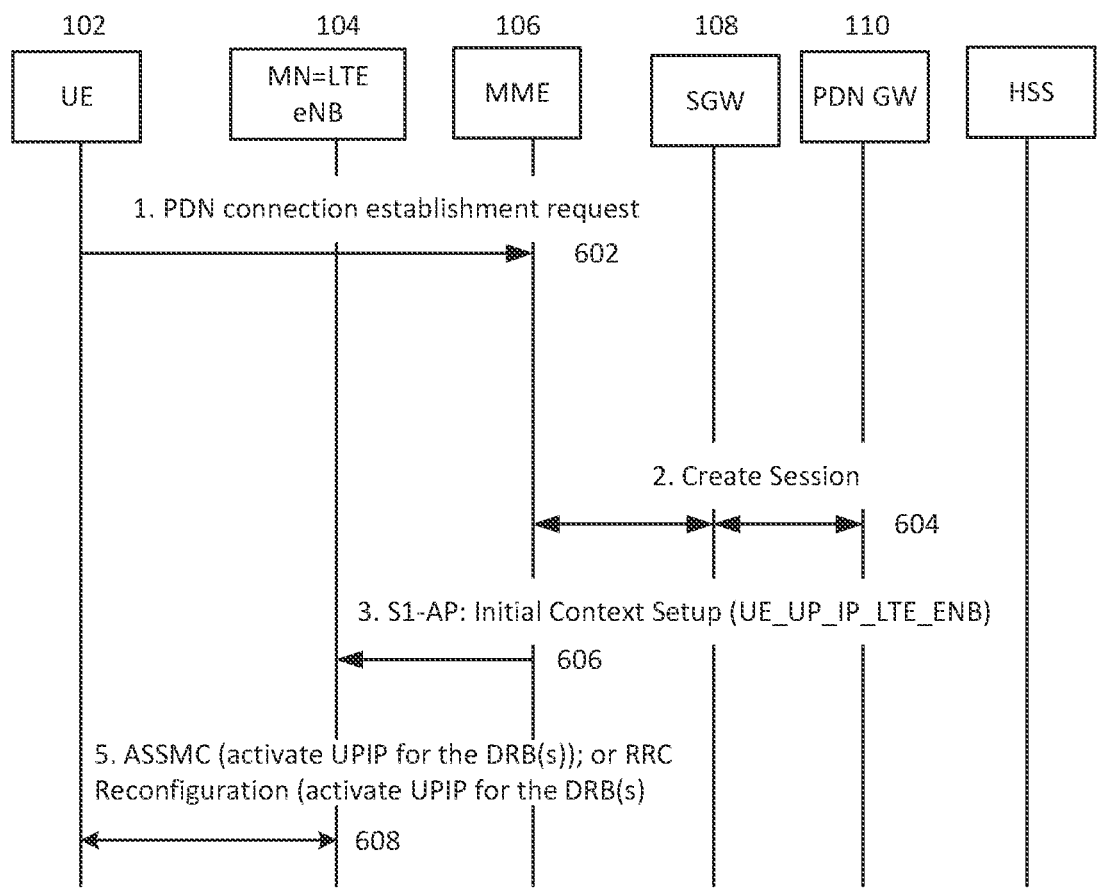
FIG. 6 illustrates operations to configure network devices during a PDY connection setup procedure, in accordance with some embodiments of the present disclosure.

In another embodiment of inventive concepts, UP IP may be enabled during, e.g., a Packet Data Network (PDN) connection establishment as illustrated in FIG. 6. As shown in FIG. 6, at 602, UE 102 initiates a PDN connection establishment procedure in order to establish a data bearer with the network.

At 604, MME 106 initiates a Creates Session procedure to establish a default bearer with UE 102.

At 606, MME 106 initiates an Initial Context Setup procedure with LTE eNB 104 and may include UE 102 security capability UE_UP_IP_LTE_ENB to LTE eNB 104.

At 608, LTE eNB 104 initiates a AS SMC (AS Security Mode Command) procedure with UE 102 and may indicate to UE 102 to activate UP integrity protection for DRBs (data radio bearers) established with LTE eNB 104.

Figure 19:
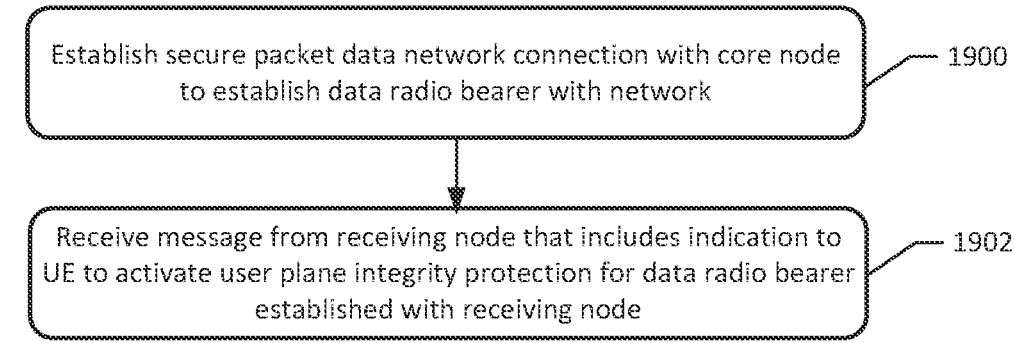

These and other related operations are now described in the context of the operational flowcharts of FIGS. 15, 19, 26-27, 34, and 37. FIGS. 15 and 19 are flowcharts of operations that can be performed by a UE. FIGS. 26 and 27 are flowchart of operations that can be performed by an access and mobility node. FIGS. 34 and 37 are flowcharts of operations that can be performed by a radio access node.

Referring initially to FIG. 15, operations can be performed by a UE (e.g., 4400 in FIG. 44) for enabling user plane integrity protection of data in a radio access network PDCP. The operations include the operations described above with reference to FIG. 15.

In at least some embodiments, referring to the example embodiment of FIG. 19, the operations further include establishing 1900 a secure packet data network connection with a core node to establish a data radio bearer with the network. The operations further include receiving 1902 a message from the receiving node that includes an indication to the UE to activate user plane integrity protection for the data radio bearer established with the receiving node.

The radio access node can be a long term evolution eNodeB (e.g., radio access node 4500, e-UTRA Node B, 4G Node B).

The core node can be a mobility management node (e.g., MME 4700).

The receiving node can be a long term evolution eNodeB (e.g., radio access node 4500, e-UTRA Node B, 4G Node B).

Referring to FIGS. 26-27, operations can be performed by a network node (e.g., 4600 in FIG. 46) for enabling a user plane integrity protection mode in a radio access network packet data convergence protocol (PDCP). The operations can include the operations described above with reference to FIGS. 26-27.

Referring to FIG. 34, operations can be performed by a radio access node (e.g., 4500 in FIG. 45) for enabling a user plane integrity protection mode in a radio access network packet data convergence protocol (PDCP). The operations include the operations described above with reference to FIGS. 34-35.

In at least some embodiments, referring to the example embodiment of FIG. 37, the operations further include sending 3700 a message to the UE that includes an indication to the UE to activate the UP IP mode.

The radio access node can be a long term evolution eNodeB (e.g., radio access node 4500, e-UTRA Node B, 4G Node B).

The core node can be a mobility management node (e.g., MME 4700).

The radio access node can be a long term evolution eNodeB (e.g., radio access node 4500, e-UTRA Node B, 4G Node B).

Figure 7:
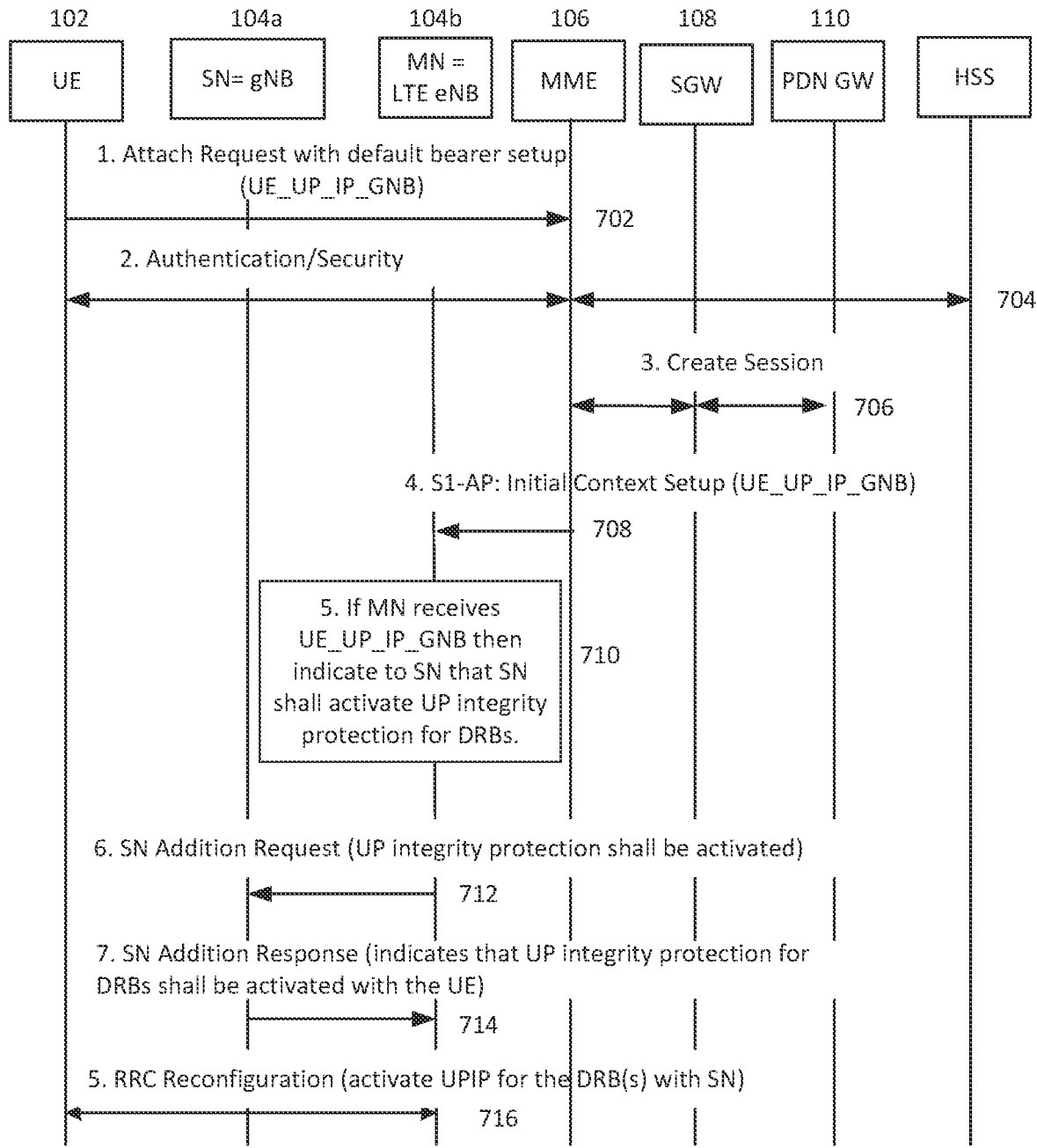
FIG. 7 illustrates operations to configure network devices during an attach request with default bearer setup, in accordance with some embodiments of the present disclosure.

In another embodiment of inventive concepts, UP IP may be enabled in another attach request with default bearer setup as illustrated in FIG. 7. As shown in FIG. 7, at 702, UE 102 attaches to the network and include an indicator for a new radio (NR) UP IP security capability of UE 102, UE_UP_IP_GNB, into the Attach Request message. UE_UP_IP_GNB indicates that UE 102 supports User Plane integrity protection in NR PDCP. UE_UP_IP_GNB also indicates the UE's 102 full data rate for UP integrity protection.

The UE_UP_IP_GNB (also referred to herein as new radio (e.g., for a gNB radio access node) user plane integrity protection mode (new radio UP IP mode) includes one of:

The UE supports user plane integrity protection in new radio PDCP with a gNB in 4G networks at a full data rate, and The UE supports user plane integrity protection at a defined rate that is less than the full data rate with a gNB in 4G networks.

At, 704, MME 106 initiates Authentication procedure and/or NAS Security Mode Command procedure to establish security between UE 102 and MME 106.

At 706, MME 106 initiates a Creates Session procedure to establish a default bearer with UE 102.

At 708, MME 106 initiates a Initial Context Setup procedure with LTE eNB 104a and includes UE 102 security capability UE_UP_IP_GNB to LTE eNB 104a.

At 710, LTE eNB 104 in Enhanced Dual Connectivity is acting as a Master Node (MN), and if it receives the UE 102 security capability UE_UP_IP_GNB from MME 106, then LTE eNB 104*a* indicates to gNB 104*b* acting as Secondary Node, that gNB 104*b* shall activate UP integrity protection DRB's established with UE 102.

At 712, LTE eNB 104*a* initiates a SN Addition procedure with gNB 104*b* and indicates to gNB 104*b* to activate new radio UP IP mode for DRB's established with UE 102.

At 714, gNB 104*b* responds with a SN Addition Response message to LTE eNB 104*a* and indicates that new radio UP IP mode for DRB's should be activated with UE 102.

At 716, LTE eNB 104*a* initiates a RRC Connection Reconfiguration procedure with UE 102 and indicates to UE 102 to activate new radio UP IP mode for the DRBs (data radio bearers) established with gNB 104*b* (SN).

Figure 38:
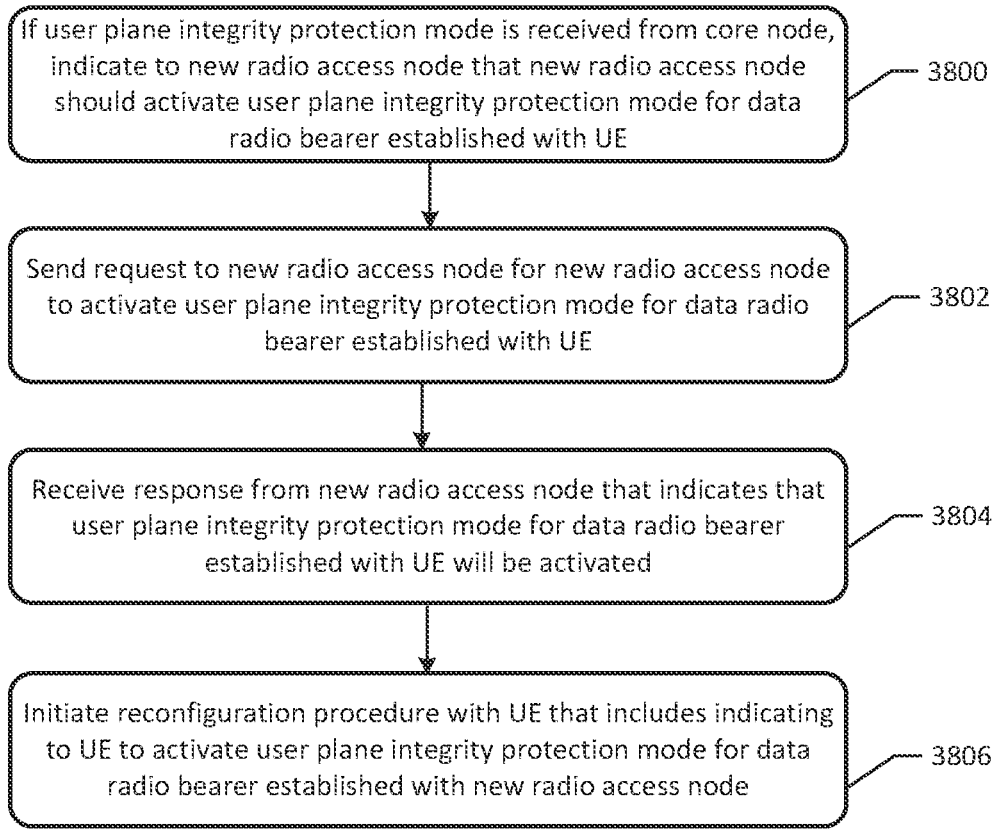
Figure 39:
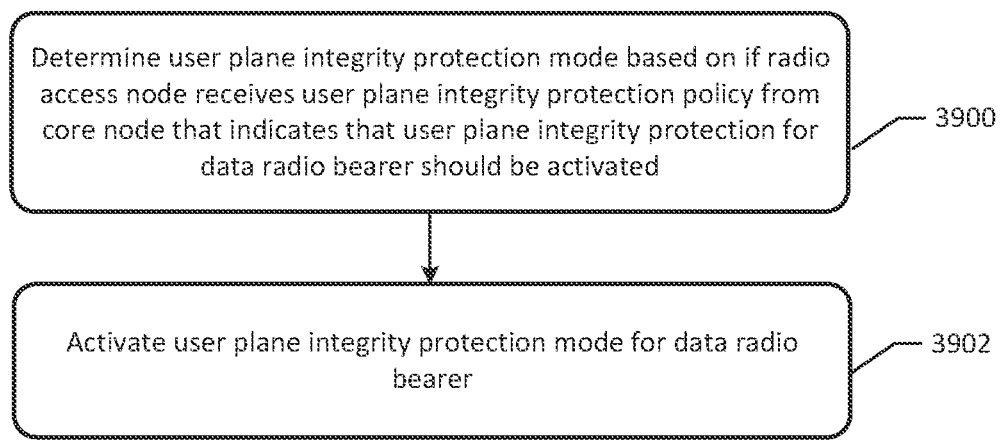
Figure 40:
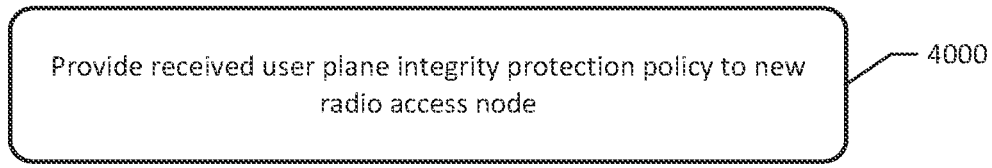
Figure 41:
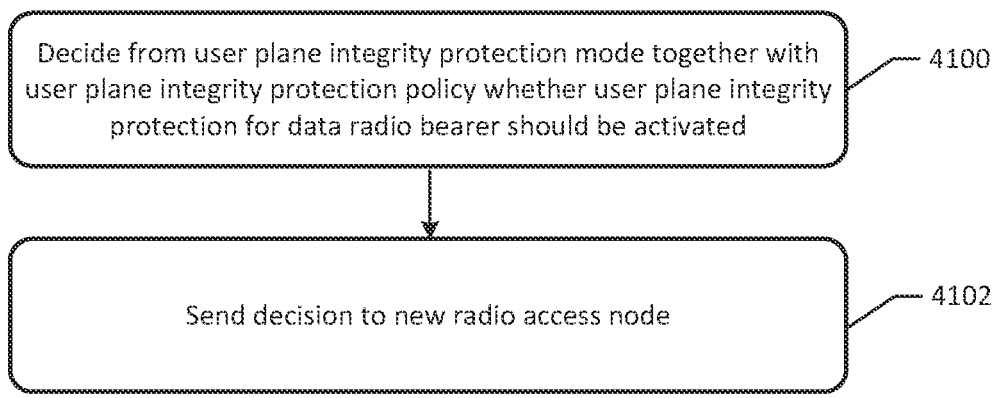

These and other related operations are now described in the context of the operational flowcharts of FIGS. 15-17, 26, 28-30, 34, and 37-38. FIG. 15-17 are flowcharts of operations that can be performed by a UE. FIGS. 26, 28-30 and 35 are flowcharts of operations that can be performed by a network node. FIGS. 34, 37 and 38 are flowcharts of operations that can be performed by a radio access node.

Referring initially to FIGS. 15-17, operations can be performed by a UE (e.g., 4400 in FIG. 44) for enabling user plane integrity protection of data in a radio access network PDCP. The operations include the operations described above with reference to FIGS. 15-17.

In at least some embodiments, UP IP mode is one of (1) the UE supports user plane integrity protection in new radio PDCP with a gNB in a 4G network at a full data rate and (2) the UE supports user plane integrity protection at a defined rate that is less than the full data rate with a gNB in a 4G network.

Referring to FIG. 26, operations can be performed by a network node (e.g., 4600 in FIG. 46) for enabling a user plane integrity protection mode in a radio access network packet data convergence protocol (PDCP). The operations include the operations described above with reference to FIGS. 26. The UP IP mode can be one of (1) the UE supports user plane integrity protection in new radio PDCP with a gNB in a 4G network at a full data rate and (2) the UE supports user plane integrity protection at a defined rate that is less than the full data rate with a gNB in a 4G network.

Figure 28:
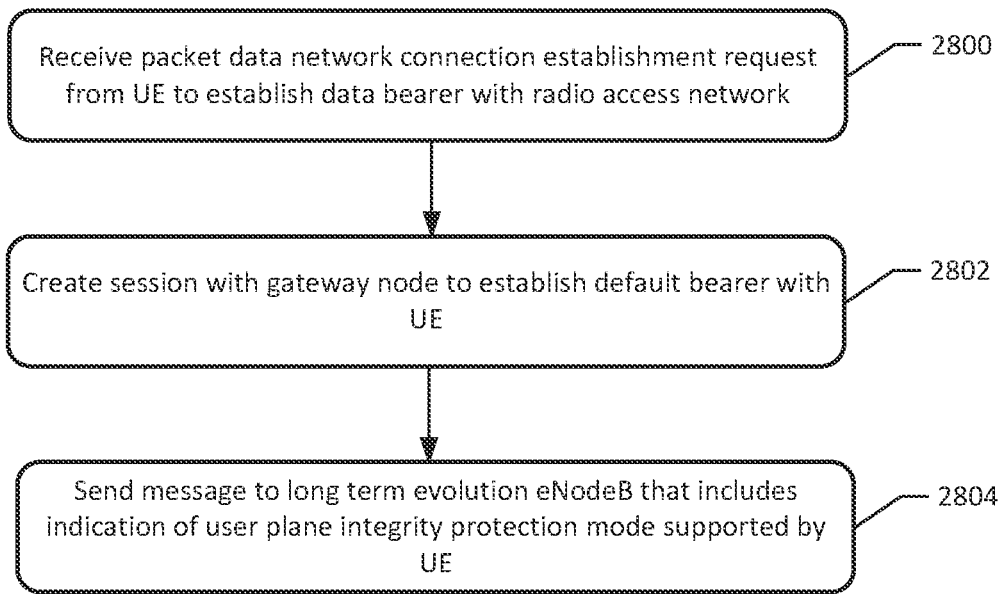

In at least some embodiments, referring to the example embodiment of FIG. 28, the operations further include receiving 2802 a packet data network connection establishment request from the UE to establish a data bearer with the radio access network; and creating 2804 a session with the gateway node to establish the default bearer with the UE. Responsive to establishing the default bearer, the operations further include sending 2806 a message to the long term evolution eNodeB that includes the indication of the UP IP mode supported by the UE.

In at least some embodiments, referring to the example embodiment of FIG. 29, the operations further include the attach request does not include a default radio bearer setup; and further include sending 2900 a message to the long term evolution eNode B to initiate a context setup procedure with the long term evolution eNode B. The message includes providing the UP IP mode of the UE to the long term evolution eNode B.

Figure 30:
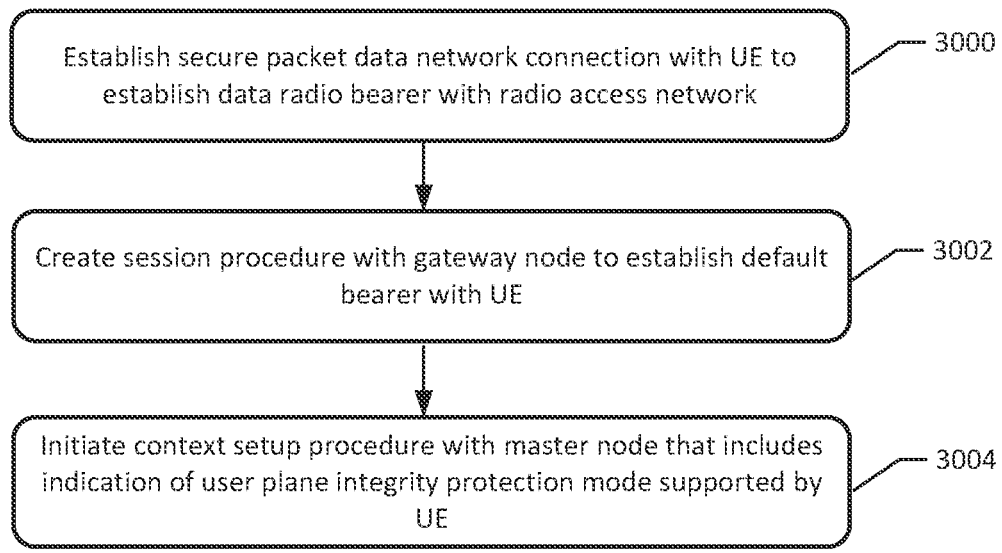

In at least some embodiments, referring to the example embodiment of FIG. 30, the UP IP mode is one of (1) the UE supports user plane integrity protection in new radio PDCP with a gNB in a 4G network at a full data rate and (2) the UE supports user plane integrity protection at a defined rate that is less than the full data rate with a gNB in a 4G network. The operations further include establishing 3000 a secure packet data network connection with the UE to establish a data radio bearer with the radio access network. The operations further include creating 3002 a session procedure with a gateway node (e.g., SGW 108) to establish a default bearer with the UE; and initiating 3004 a context setup procedure with the receiving node that includes the indication of the UP IP mode supported by the UE.

Referring to FIG. 34, operations can be performed by a radio access node (e.g., 4500 in FIG. 45) for enabling a user plane integrity protection mode in a radio access network packet data convergence protocol (PDCP). The operations include the operations described above with reference to FIG. 34. The UP IP mode may include one of:
the UE supports user plane integrity protection in new radio PDCP with a gNB in a 4G network at a full data rate, and
the UE supports user plane integrity protection at a defined rate that is less than the full data rate with a gNB in a 4G network.

In at least some embodiments, referring to the example embodiment of FIG. 37, the operations further include sending 3700 a message to the UE that includes an indication to the UE to activate the UP IP mode.

In at least some embodiments, referring to the example embodiment of FIG. 38, the operations further include if the UP IP mode is received from the core node, indicating 3800 to a new radio access node that the new radio access node should activate the UP IP mode for a data radio bearer established with the UE. The operations further include sending 3802 a request to the new radio access node for the new radio access node to activate the UP IP mode for the data radio bearer established with the UE. The operations further include receiving 3804 a response from the new radio access node that indicates that the UP IP mode for the data radio bearer established with the UE will be activated; and initiating 3806 a reconfiguration procedure with the UE that includes indicating to the UE to activate the UP IP mode for the data radio bearer established with the new radio access node.

The radio access node can be a long term evolution eNodeB (e.g., radio access node 4500, e-UTRA Node B, 4G Node B).

The core node can be a mobility management node (e.g., MME 4700).

The new radio access node can be a new radio node (gNB), a E-UTRA (ng-eNB) (e.g., radio access node 4500).

Figure 8:
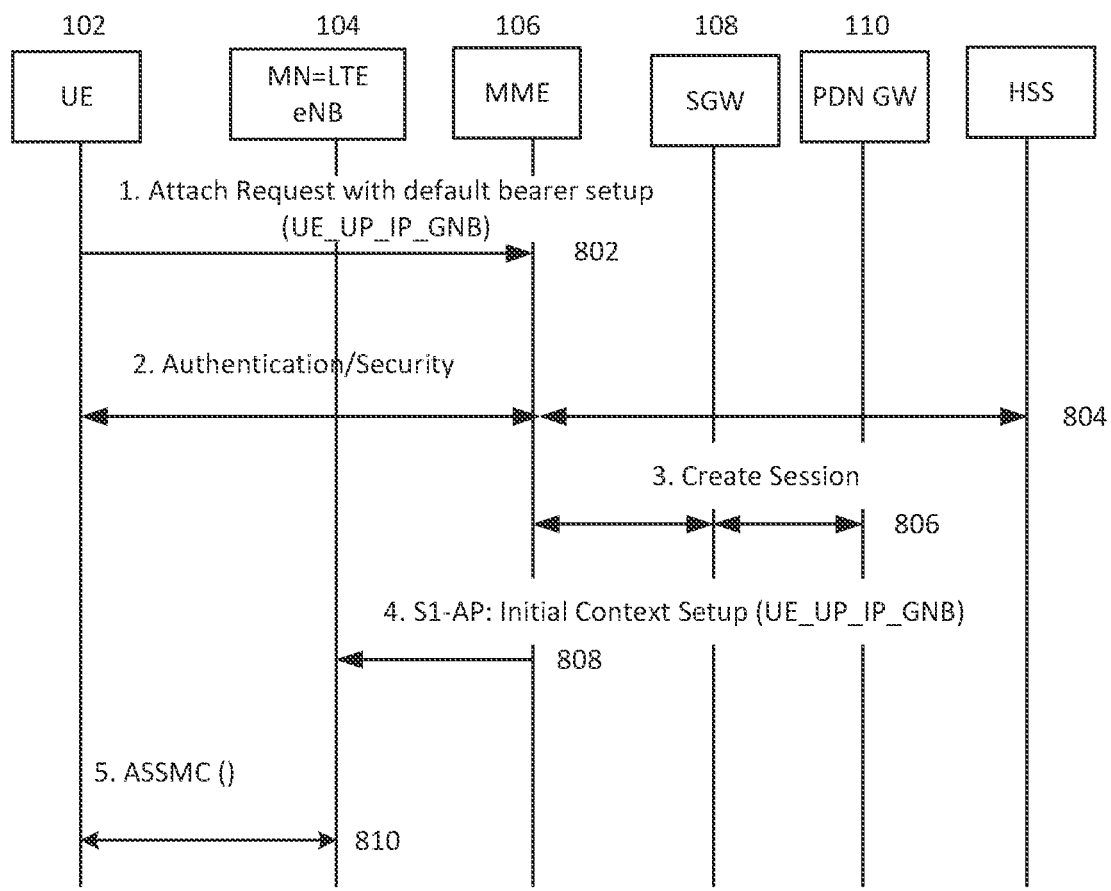
FIG. 8 illustrates operations to configure network devices during an attach request without default bearer setup, in accordance with some embodiments of the present disclosure.

In another embodiment of inventive concepts, UP IP is enabled during, e.g., a another attach request without default bearer setup as illustrated in FIG. 8. As shown in FIG. 8, at 802, UE 102 attaches to network and includes the new radio UP IP mode for UE 102, UE_UP_IP_GNB, into the Attach Request message. UE_UP_IP_GNB indicates that UE 102 supports User Plane integrity protection in NR PDCP. UE_UP_IP_GNB also indicates the UE's 102 full data rate for UP integrity protection.

At 804, MME 106 initiates a Authentication procedure and/or NAS Security Mode Command procedure to establish security between UE 102 and MME 106.

At 806, MME 106 initiates a Creates Session procedure to establish a default bearer with UE 102.

At 808, MME 106 initiates an Initial Context Setup procedure with LTE eNB 104 and may include UE security capability UE_UP_IP_GNB to LTE eNB 104.

At 810, LTE eNB 104 initiates a AS SMC (AS Security Mode Command) procedure with UE 102. No DRB's with UE 102 may be established.

These and other related operations are now described in the context of the operational flowcharts of FIGS. 15-18, 26-27, 34, and 36. FIG. 15-18 are flowcharts of operations that can be performed by a UE. FIGS. 26-27 are flowcharts of operations that can be performed by a network node. FIGS. 34 and 36 are flowcharts of operations that can be performed by a radio access node.

Referring initially to FIGS. 15-18, operations can be performed by a UE (e.g., 4400 in FIG. 44) for enabling user plane integrity protection of data in a radio access network PDCP. The operations include the operations described above with reference to FIGS. 15-18.

In at least some embodiments, UP IP mode is one of (1) the UE supports user plane integrity protection in new radio PDCP with a gNB in a 4G network at a full data rate and (2) the UE supports user plane integrity protection at a defined rate that is less than the full data rate with a gNB in a 4G network.

Referring to FIGS. 26-27, operations can be performed by a network node (e.g., 4600 in FIG. 46) for enabling a user plane integrity protection mode in a radio access network packet data convergence protocol (PDCP). The operations include the operations described above with reference to FIGS. 26-27. The UP IP mode can be one of (1) the UE supports user plane integrity protection in new radio PDCP with a gNB in a 4G network at a full data rate and (2) the UE supports user plane integrity protection at a defined rate that is less than the full data rate with a gNB in a 4G network.

Referring to FIG. 34, operations can be performed by a radio access node (e.g., 4500 in FIG. 45) for enabling a user plane integrity protection mode in a radio access network packet data convergence protocol (PDCP). The operations include the operations described above with reference to FIG. 34. The UP IP mode can include one of: the UE supports user plane integrity protection in new radio PDCP with a gNB in a 4G network at a full data rate, and the UE supports user plane integrity protection at a defined rate that is less than the full data rate with a gNB in a 4G network.

Figure 9:
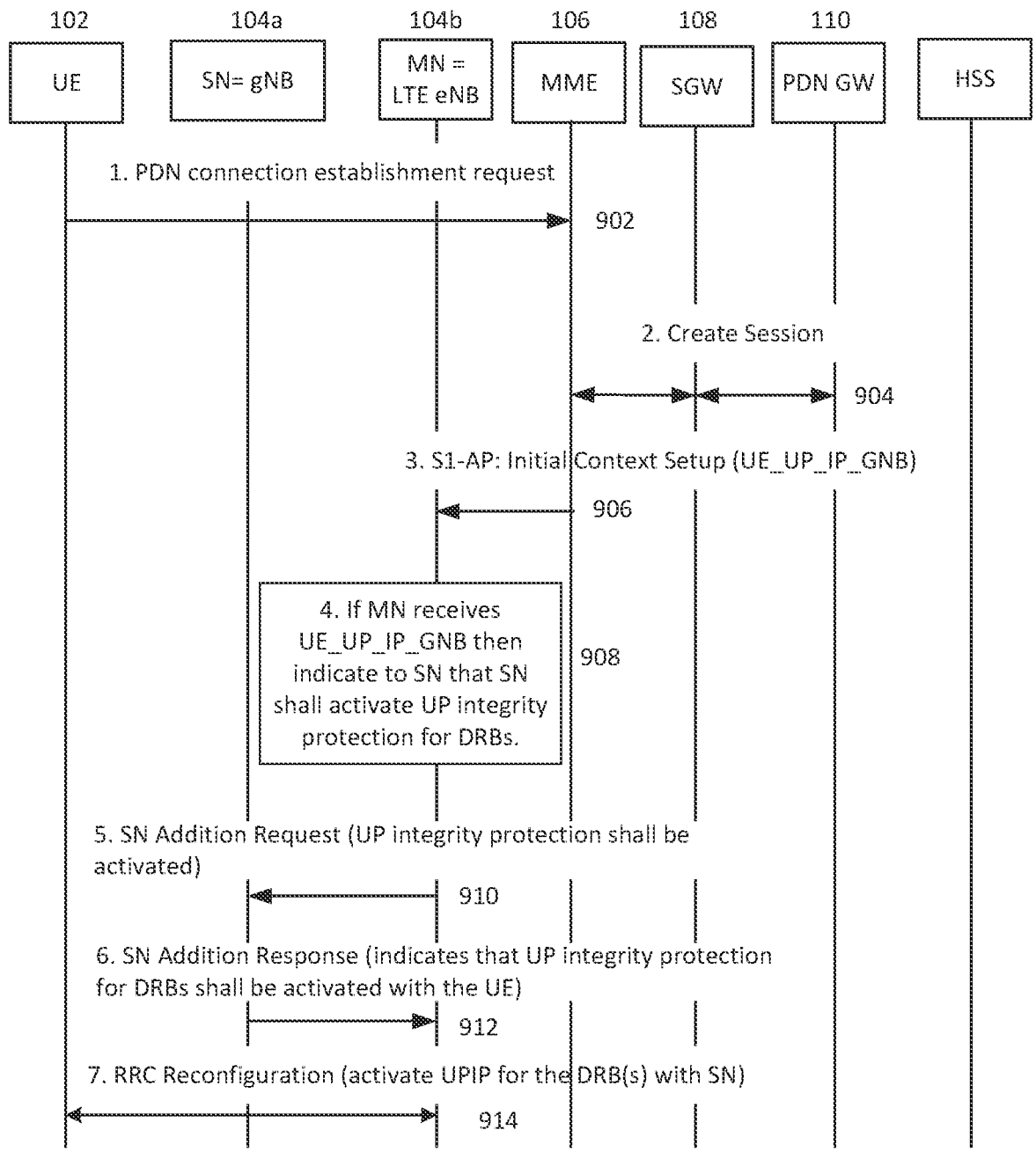
FIG. 9 illustrates operations to configure network devices during a PDU connection setup procedure, in accordance with some embodiments of the present disclosure.

In another embodiment of inventive concepts, UP IP is enabled during, e.g., during another PDU connection setup procedure as illustrated in FIG. 9. As shown in FIG. 9, at 902, UE 102 initiates a PDN connection establishment procedure to establish a data bearer with the network.

At 904, MME 106 initiates a Creates Session procedure to establish a default bearer with UE 102.

At 906, MME 106 initiates an Initial Context Setup procedure with LTE eNB 104*b* and may include UE security capability UE_UP_IP_GNB to LTE eNB 104*a*.

At 908, LTE eNB 104*b* can be in Enhanced Dual Connectivity acting as Master Node (MN)—if it receives the UE security capability UE_UP_IP_GNB from MME 106, then LTE eNB 104*b* indicates to gNB 104*a* acting as Secondary Node, that gNB 104*a* should activate new radio UP IP mode for DRB's established with UE 102.

At 910, LTE eNB 104*b* initiates a SN Addition procedure with gNB 104*a* and indicates to gNB 104*a* to activate new radio UP IP mode for DRB's established with the UE. It may also be an option indicate UE_UP_IP_GNB to gNB 104*a*.

At 912, gNB 104*a* responds with a SN Addition Response message to LTE eNB 104*b* and indicates that new radio UP IP mode for DRB's should be activated with UE 102.

At 914, LTE eNB 104*b* initiates a RRC Connection Reconfiguration procedure with UE 102 and indicates to UE 102 to activate new radio UP IP mode for the DRBs (data radio bearers) established with gNB 104*a* (SN).

These and other related operations are now described in the context of the operational flowcharts of FIGS. 15, 19, 26, 28-30, 34, 35, 37, and 38. FIGS. 15 and 19 are flowcharts of operations that can be performed by a UE. FIGS. 26, 28-30, and 35 are flowcharts of operations that may be performed by a network node. FIGS. 34, 37, and 38 are flowcharts of operations that can be performed by a radio access node.

Referring to FIGS. 26, 38-30, and 35, operations can be performed by a network node (e.g., 4600 in FIG. 46) for enabling a user plane integrity protection mode in a radio access network packet data convergence protocol (PDCP). The operations include the operations described above with reference to FIGS. 26, 28-30 and 35. The UP IP mode can be one of (1) the UE supports user plane integrity protection in new radio PDCP with a gNB in a 4G network at a full data rate and (2) the UE supports user plane integrity protection at a defined rate that is less than the full data rate with a gNB in a 4G network.

Referring to FIGS. 34, 37 and 38, operations can be performed by a radio access node (e.g., 4500 in FIG. 45) for enabling a user plane integrity protection mode in a radio access network packet data convergence protocol (PDCP). The operations include the operations described above with reference to FIGS. 34, 37 and 38. The UP IP mode can include one of: the UE supports user plane integrity protection in new radio PDCP with a gNB in a 4G network at a full data rate, and the UE supports user plane integrity protection at a defined rate that is less than the full data rate with a gNB in a 4G network.

Figure 10:
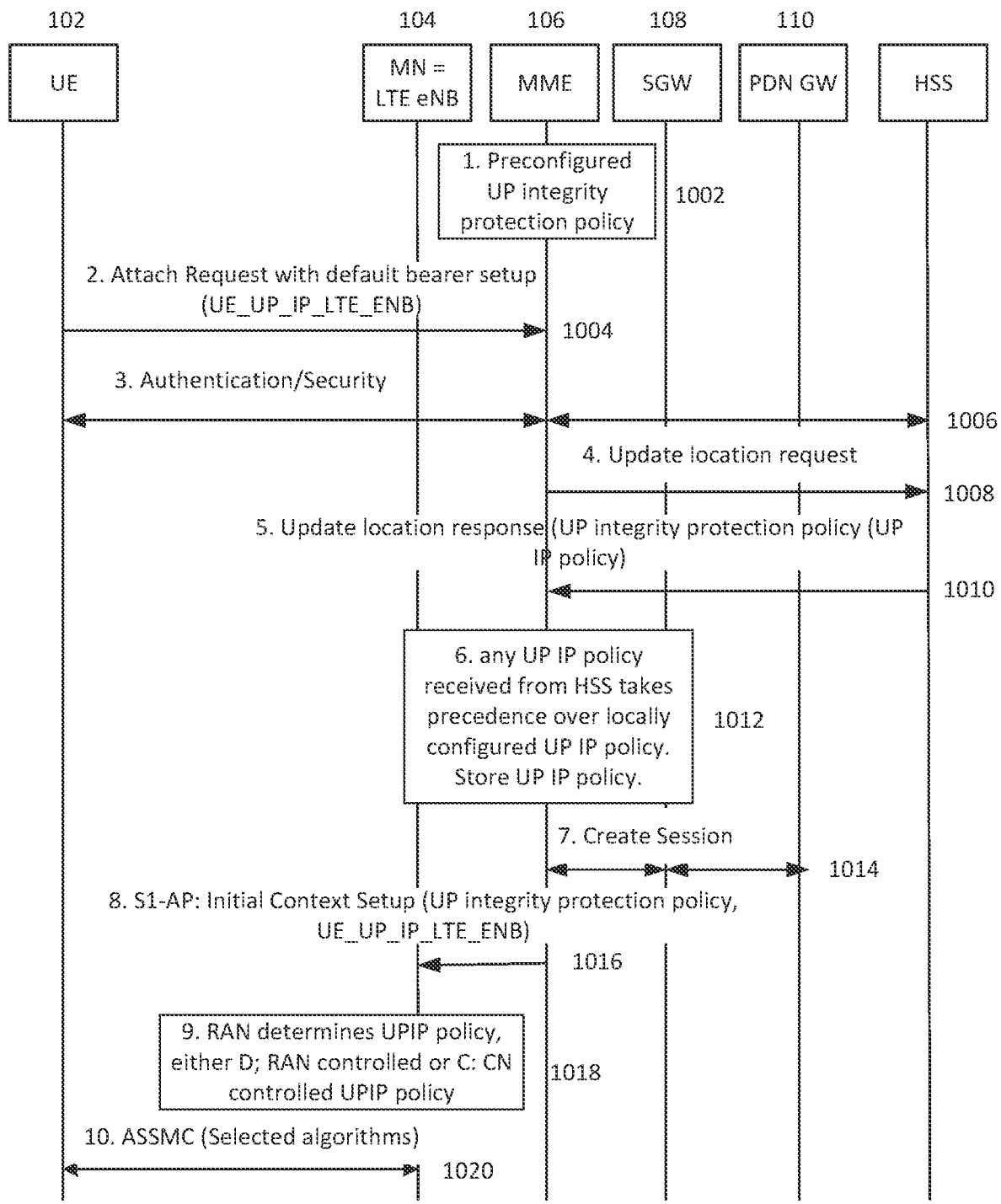
FIG. 10 illustrates operations to configure network devices during a core network controlled user plane integrity protection policy, in accordance with some embodiments of the present disclosure.

In another embodiment of inventive concepts, UP IP is enabled during, e.g., during a core network controlled UP integrity protection policy as illustrated in FIG. 10. As shown in FIG. 10, at 1002, MME 106 is preconfigured locally with a policy for User Plane Integrity protection (UP IP policy). The UP IP policy could apply to only UP integrity protection in LTE eNB, or only UP integrity protection in gNB, or both.

At 1004, UE 102 attaches to the network and may include UE_UP_IP_LTE_ENB and/or UE_UP_IP_GNB into an Attach Request message. UE_UP_IP_LTE_ENB indicates that UE 102 supports User Plane integrity protection in LTE PDCP. UE_UP_IP_LTE_ENB also indicates the UE's 102 full data rate for UP integrity protection. UE_UP_IP_GNB indicates that UE 102 supports User Plane integrity protection in NR PDCP. UE_UP_IP_GNB also indicates the UE's 102 full data rate for UP integrity protection.

At 1006, MME 106 initiates an Authentication procedure and/or NAS Security Mode Command procedure to establish security between UE 102 and MME 106.

At 1008, MME 106 initiates a Location Update procedure in HSS (e.g., a core network server).

At 1010, HSS responds with a Location Update Response message and may include subscription data information as UP integrity protection policy (UP IP policy) to MME 106.

At 1012, any UP IP policy received from HSS takes precedence over locally configured UP IP policy in MME 106. MME 106 stores the determined UP IP policy.

At 1014, MME 106 initiates a Creates Session procedure to establish a default bearer with UE 102.

At 1016, MME 106 initiates a Initial Context Setup procedure with LTE eNB 104 and includes UE security capability UE_UP_IP_LTE_ENB and/or UE_UP_IP_GNB to the LTE eNB 104 together with the determined UP integrity protection policy (UP IP policy).

At 1018, if the UP integrity protection policy (UP IP policy) indicates that UP integrity protection for the DRB's should be activated, then LTE eNB 104 initiates a AS SMC (AS Security Mode Command) procedure with UE 102 and indicates to UE 102 to activate UP integrity protection for DRBs (data radio bearers).

If Dual Connectivity or Enhanced Dual Connectivity (Option 3) is used, then:
  LTE eNB 104 indicates the received UP integrity protection policy (UP IP policy) to the Secondary Node (a LTE eNB or a gNB); or
  the LTE eNB 104 determines from the UE_UP_IP_LTE_ENB and/or UE_UP_IP_GNB together with the UP integrity protection policy (UP IP policy) whether UP integrity protection for DRB's shall be activated and indicate the decision to the Secondary Node (a LTE eNB or a gNB).

These and other related operations are now described in the context of the operational flowcharts of FIGS. 15-17, 22, 26-27, 31-32, 34, and 39-41. FIGS. 15-17 and 22 are flowcharts of operations that can be performed by a UE. FIGS. 26-27 and 31-32 are flowcharts of operations that can be performed by a network node. FIGS. 34 and 39-41 are flowcharts of operations that can be performed by a radio access node.

Referring initially to FIGS. 15-17, operations can be performed by a UE (e.g., 4400 in FIG. 44) for enabling user plane integrity protection of data in a radio access network PDCP. The operations include the operations described above with reference to FIGS. 15-17.

The UP IP mode can be one of (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

Figure 22:
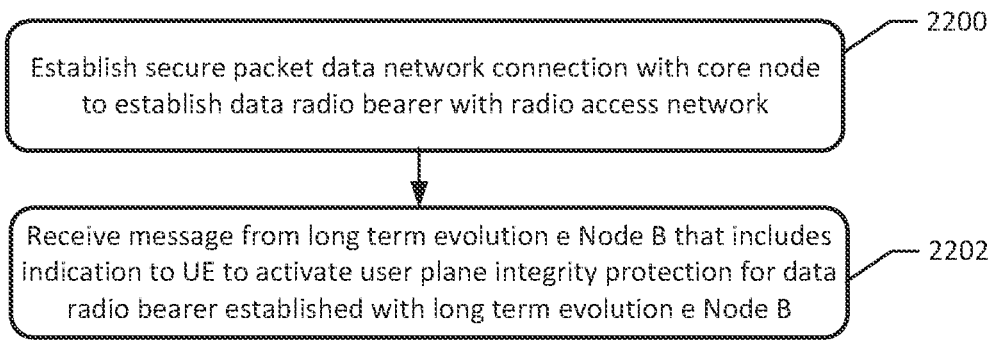

In at least some embodiments, referring to the example embodiment of FIG. 22, the operations further include establishing 2200 a secure network connection with a core node; and receiving 2202 a message from a long term evolution e Node B that includes an indication to the UE to activate the UP IP mode for the data radio bearer established with the long term evolution e Node B.

The radio access network can be a 4G network.

The core node can be a mobility management node (e.g., MME 4700).

Referring to FIGS. 26-27, operations can be performed by a network node (e.g., 4600 in FIG. 46) for enabling a user plane integrity protection mode in a radio access network packet data convergence protocol (PDCP). The operations include the operations described above with reference to FIGS. 26-27. The UP IP mode can be one of (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

Figure 31:
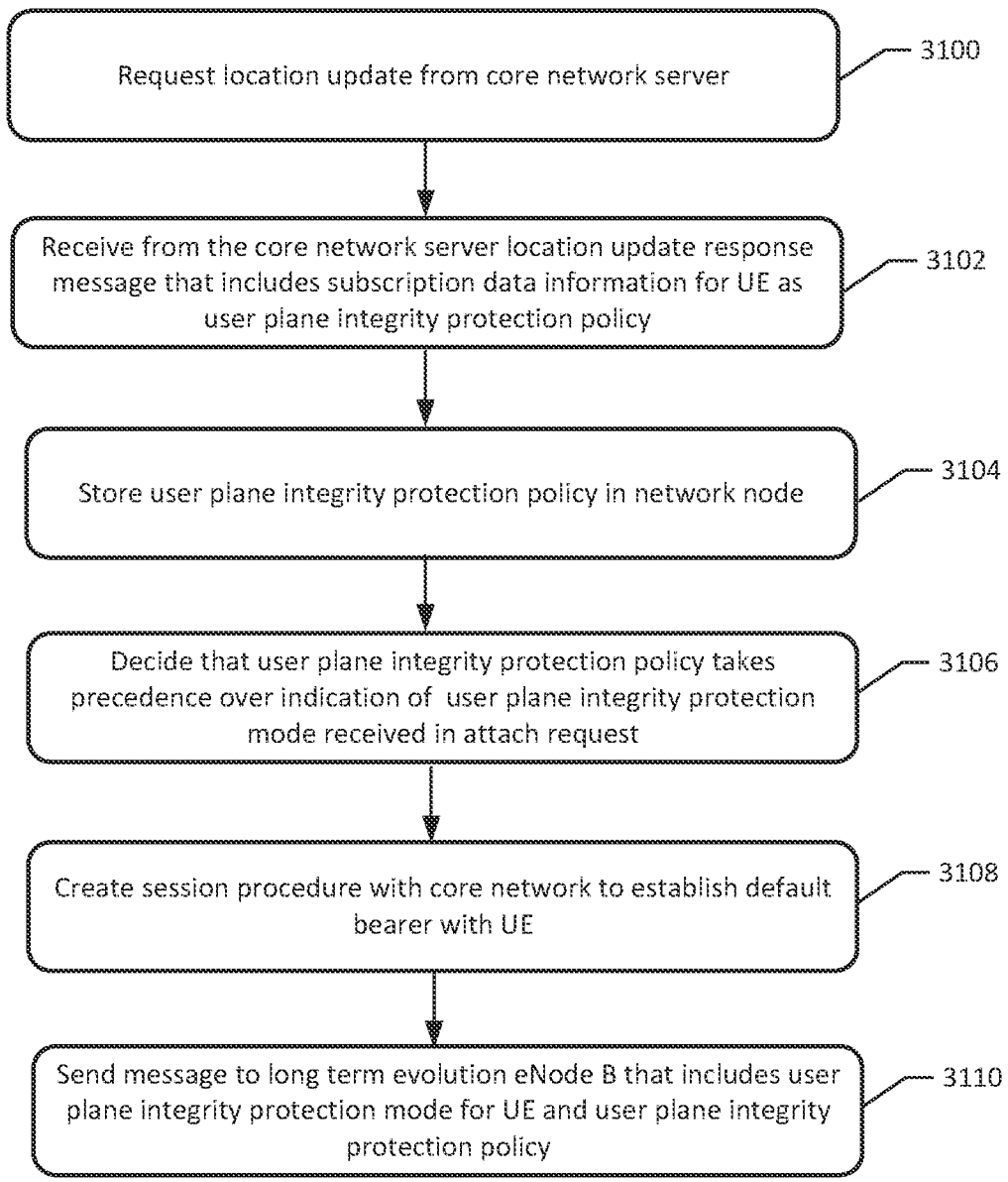

In at least some embodiments, referring to the example embodiment of FIG. 31, the operations further include requesting 3100 a location update from a core network server; and receiving 3102 from the core network server a location update response message that includes subscription data information for the UE as the user plane integrity protection policy. The operations further include storing 3104 the user plane integrity protection policy in the network node; and deciding 3106 that the user plane integrity protection policy takes precedence over the indication of the UP IP mode received in the attach request. The operations further include creating 3108 a session procedure with the core network to establish a default bearer with the UE; and sending 3110 a message to a long term evolution eNode B that includes the UP IP mode for the UE and the user plane integrity protection policy.

Figure 32:
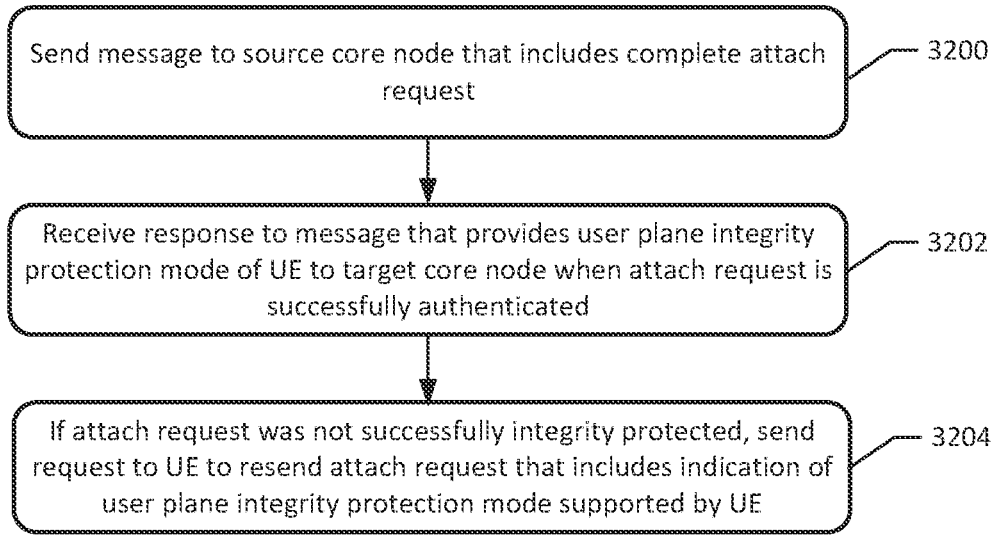

In at least some embodiments, referring to the example embodiment of FIG. 32, the operations further include sending 3200 a message to a source core node that includes the complete attach request; and receiving 3202 a response to the message, wherein the response provides the UP IP mode of the UE to the target core node when the attach request is successfully authenticated. If the attach request was not successfully integrity protected, the operations further include sending 3204 a request to the UE to resend the attach request that includes the indication of the UP IP mode supported by the UE.

The radio access network can be a 4G network.

The core network server can be a server located in the core network.

The source core node, and target core node each can be a mobility management node (e.g., MME 106, network node 4600).

Figure 11:
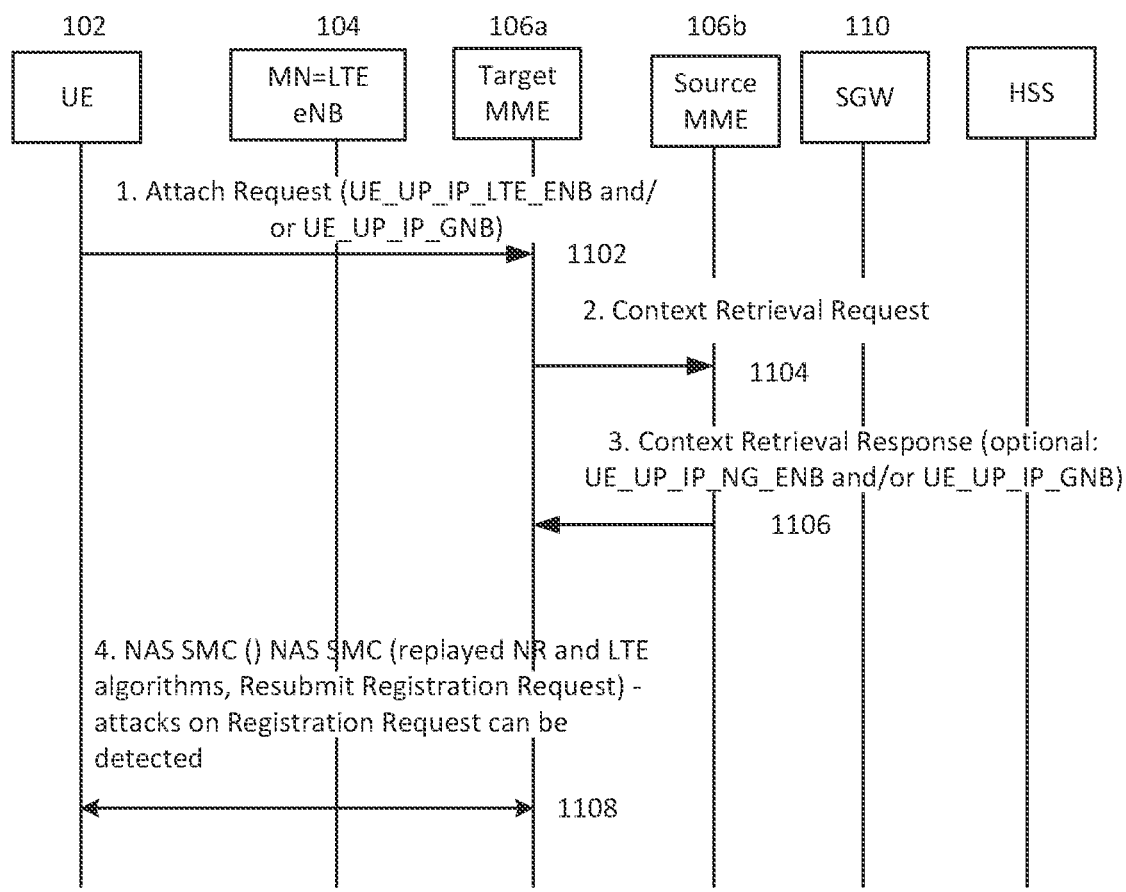
FIG. 11 illustrates operations to configure network devices during a mobility registration update—S10 interface, in accordance with some embodiments of the present disclosure.

In another embodiment of inventive concepts UP IP is enabled during, e.g., a mobility registration update—S10 interface as illustrated in FIG. 11. As shown in FIG. 11, at 1102, UE 102 attaches to the 4G network and includes UE_UP_IP_LTE_ENB and/or UE_UP_IP_GNB into a Attach Request message.

At 1104, target MME 106*a* contacts Source MME 106*b* and includes the complete Attach Request.

At 1106, source MME 106*b* provides the UE security capabilities e.g. UE_UP_IP_LTE_ENB and/or UE_UP_IP_GNB on S10 i/f, if stored and if Attach Request is successfully authenticated, to target MME 106*a*.

At 1108, target MME 106*a* initiates a NAS Security Mode Command with LTE eNB 104 if the Attach Request was not successfully integrity protected and requests UE 102 to resend a Attach Request including UE security capability UE_UP_IP_LTE_ENB and/or UE_UP_IP_GNB.

Figure 23:
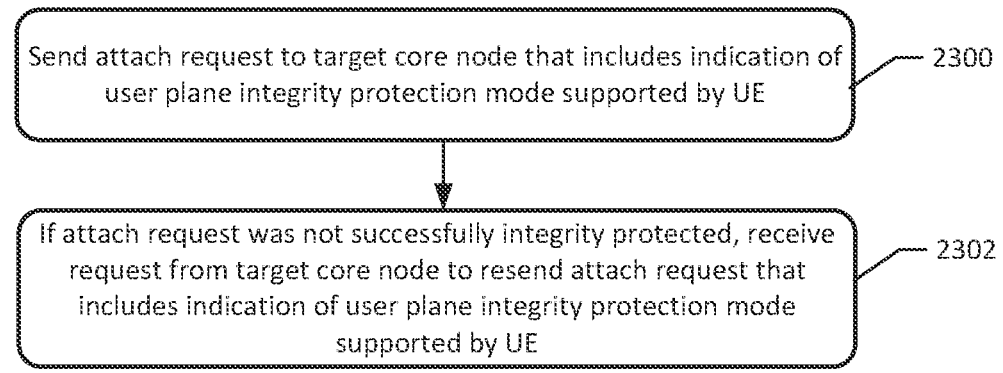

These and other related operations are now described in the context of the operational flowcharts of FIGS. 15, 23 and 26-27. FIGS. 15 and 23 are flowcharts of operations that can be performed by a UE. FIGS. 26-27 are flowchart of operations that can be performed by a network node.

Referring initially to FIG. 15, operations can be performed by a UE (e.g., 4400 in FIG. 44) for enabling user plane integrity protection of data in a radio access network PDCP. The operations include the operations described above with reference to FIG. 15.

The UP IP mode can be one of (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

In at least some embodiments, referring to the example embodiment of FIG. 23 the operations further include sending 2300 an attach request to a target core node that includes the indication of the UP IP mode supported by the UE. If the attach request was not successfully integrity protected, the operations further include receiving 2302 a request from the target core node to resend the attach request that includes the indication of the UP IP mode supported by the UE.

The radio access network can be a 4G network.

The target core node can be a mobility management node (e.g., MME 4700, MME 106a).

Referring to FIGS. 26-27, operations can be performed by a network node (e.g., 4600 in FIG. 46) for enabling a user plane integrity protection mode in a radio access network packet data convergence protocol (PDCP). The operations include the operations described above with reference to FIGS. 26-27. The UP IP mode can be one of (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

The radio access network can be a 4G network.

The target and source core nodes each can be a mobility management node (e.g., MME 4700, MME 106a).

Figure 12:
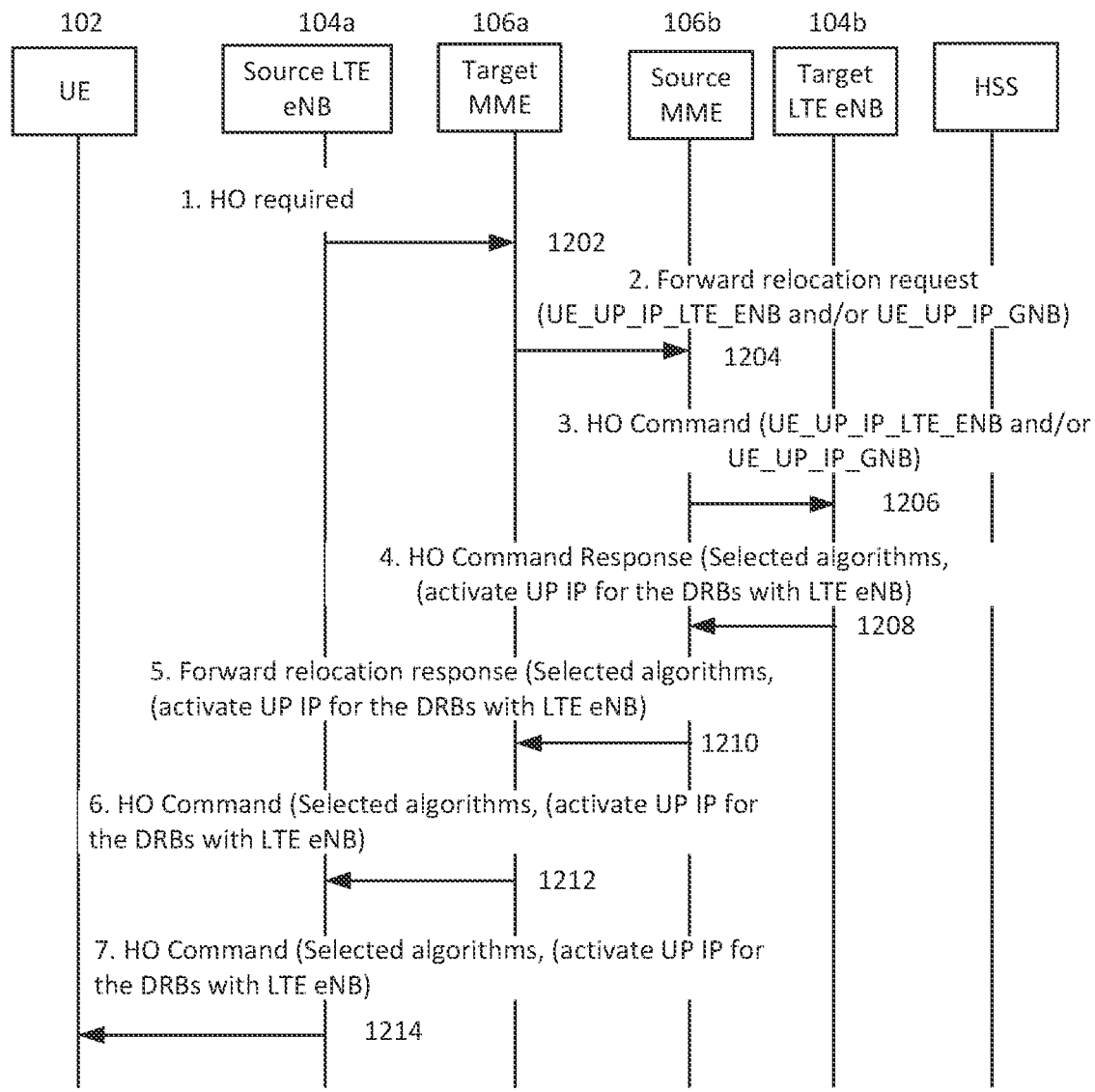
FIG. 12 illustrates operations to configure network devices during a mobility S1 handover (HO)—S10 interface, in accordance with some embodiments of the present disclosure.

In another embodiment of inventive concepts UP IP is enabled during, e.g., a mobility S1 handover (HO)—S10 interface as illustrated in FIG. 12. As shown in FIG. 12, at 1202, source LTE eNB 104a initiates handover (HO) Required with source MME 106b.

At 1204, source MME 106b initiates a Forward Relocation Request with target MME 106a and forwards UE_UP_IP_LTE_ENB and/or UE_UP_IP_GNB if stored in source MME 106b to target MME 106a.

At 1206, target LTE eNB 104b selects security algorithms and indicates to UE 102 to activate UP IP for DRBs established with LTE eNB 104b.

At 1208, target MME 106a forwards the information received in 1206 from target LTE eNB 104b to source MME 106b.

At 1210, source MME 106b forwards the information received in 1208 from target MME 106a to source LTE eNB 104a.

At 1212, source LTE eNB 104a forwards the information received in 1210 from source MME 106b to UE 102.

At 1214, UE 102 activates UP IP for DRB's established with target LTE eNB 104b.

Figure 20:
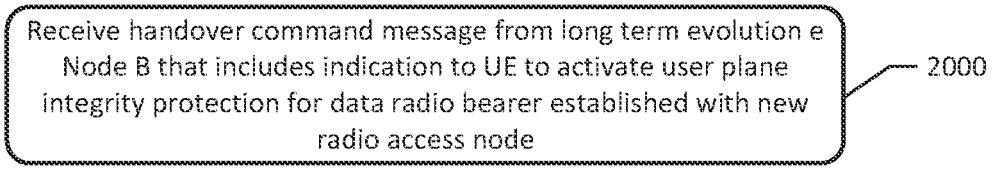
Figure 33:
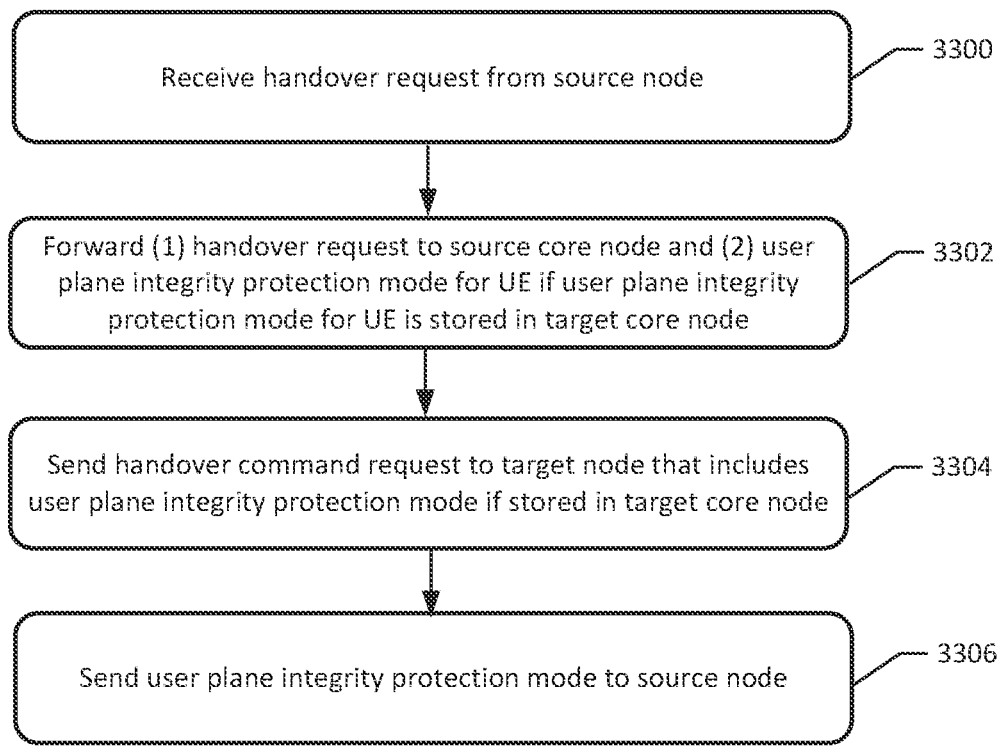
Figure 42:
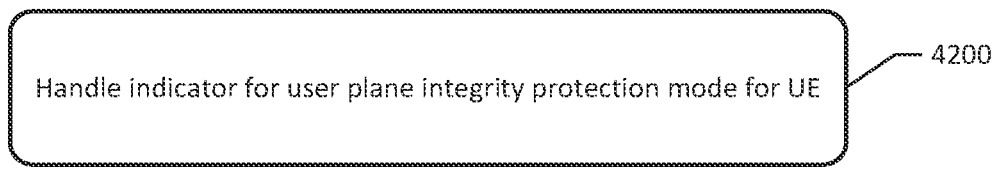
FIG. 42 is a flowchart of operations that may be performed by a mobility management node, in accordance with some embodiments of the present disclosure.

These and other related operations are now described in the context of the operational flowcharts of FIGS. 15, 20, 26, 33, 34, 37, and 42. FIGS. 15 and 20 are flowcharts of operations that can be performed by a UE. FIGS. 26, 33 and 42 are flowcharts of operations that can be performed by a network node. FIGS. 34, and 37 are flowcharts of operations that can be performed by a radio access node.

Referring initially to FIG. 15, operations can be performed by a UE (e.g., 4400 in FIG. 44) for enabling user plane integrity protection of data in a radio access network PDCP. The operations include the operations described above with reference to FIG. 15.

The UP IP mode can be one of (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

In at least some embodiments, referring to the example embodiment of FIG. 20 the operations further include receiving 2000 a handover command message from a long term evolution e Node B that includes an indication to the UE to activate the user plane integrity protection for a data radio bearer established with a new radio access node.

The radio access network can be a 4G network.

The radio access node can be a long term evolution eNodeB (e.g., radio access node 4500, e-UTRA Node B, 4G Node B).

The new radio access node can be a new radio node (gNB), a E-UTRA (ng-eNB) (e.g., radio access node 4500).

Referring to FIGS. 26 and 33, operations can be performed by a network node (e.g., 4600 in FIG. 46) for enabling a user plane integrity protection mode in a radio access network packet data convergence protocol (PDCP). The operations include the operations described above with reference to FIGS. 26 and 33. The UP IP mode can be one of (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

In at least some embodiments, referring to the example embodiment of FIG. 42, the operations further include handling (4200) an indicator for a user plane integrity protection mode for a user equipment, UE, wherein the user plane integrity protection mode (UP IP mode) comprises one of: (1) the UE supports user plane integrity protection in PDCP with a long term evolution eNode B radio access node at a full data rate; (2) the UE supports user plane integrity protection in PDCP with the long term evolution eNode B at a defined data rate that is less than the full data rate; (3) the UE supports user plane integrity protection in new radio PDCP with a gNB in a 4G network at a full data rate, and (4) the UE supports user plane integrity protection at a defined rate that is less than the full data rate with a gNB in a 4G network.

The radio access network can be a 4G network.

The network node can be a mobility management node (e.g., MME 106, network node 4600).

The mobility management node can be MME 106a (e.g., network node 4600).

The radio access node can be a long term evolution eNodeB (e.g., radio access node 4500, e-UTRA Node B, 4G Node B).

The new radio access node can be a new radio node (gNB), a E-UTRA (ng-eNB) (e.g., radio access node 4500).

Referring to FIGS. 34 and 37, operations can be performed by a radio access node (e.g., 4500 in FIG. 45) for enabling a user plane integrity protection mode in a radio access network packet data convergence protocol (PDCP). The operations include the operations described above with reference to FIGS. 34 and 37. The UP IP mode can include one of: (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

The radio access network can be a 4G network.

The radio access node can be a long term evolution eNodeB (e.g., radio access node 4500, e-UTRA Node B, 4G Node B).

Figure 13:
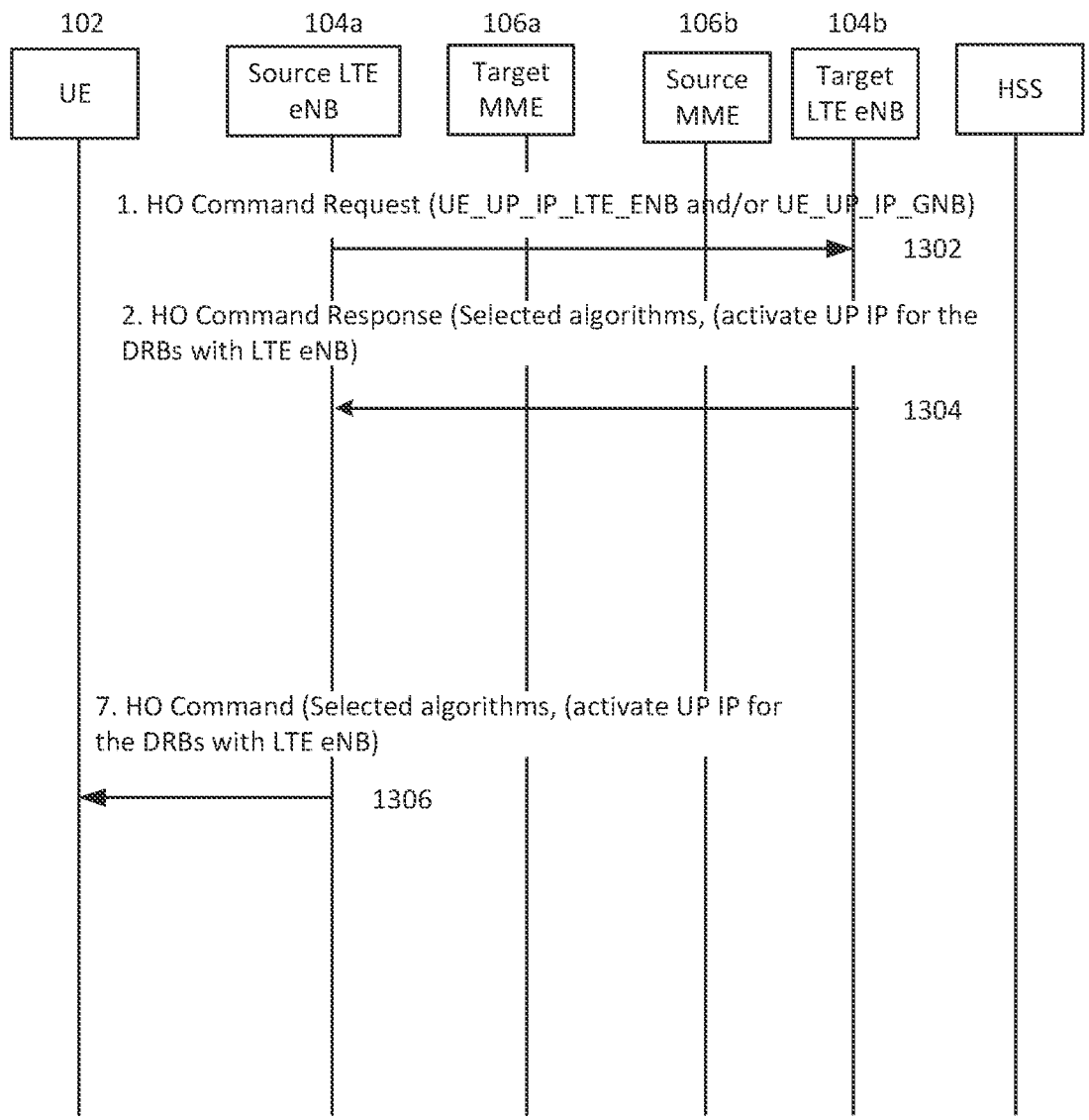
FIG. 13 illustrate operations to configure network devices during a mobility X2 handover (HO)—X2 interface, in accordance with some embodiments of the present disclosure.

In another embodiment of inventive concepts UP IP is enabled during, e.g., a mobility X2 handover (HO)—X2 interface as illustrated in FIG. 13. As shown in FIG. 13, at 1302, source LTE eNB 104*a* initiates handover (HO) Required with target LTE eNB 104*b* and indicates UE_UP_IP_LTE_ENB and/or UE_UP_IP_GNB.

At 1304, target LTE eNB 104*b* selects security algorithms and, based on indication UE_UP_IP_LTE_ENB, indicates to UE 102 to activate UP IP for DRBs established with LTE eNB 104*b*.

At 1306, source LTE eNB 104*a* forwards the information received in 1304 from target LTE eNB 104*b* to UE 102.

At 1308, UE 102 activates UP IP for DRB's established with target LTE eNB 104*b*.

Figure 24:
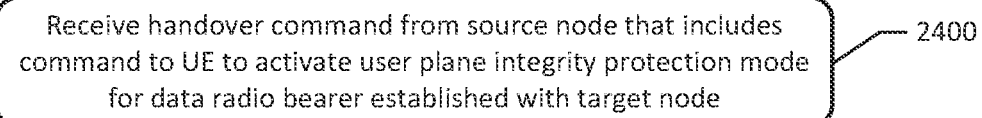

These and other related operations are now described in the context of the operational flowcharts of FIGS. 15, 24, 26, and 34. FIGS. 15 and 24 are flowcharts of operations that can be performed by a UE. FIGS. 26 is a flowchart of operations that can be performed by a network node. FIG. 34 is a flowchart of operations that can be performed by a radio access node.

Referring initially to FIG. 15, operations can be performed by a UE (e.g., 4400 in FIG. 44) for enabling user plane integrity protection of data in a radio access network PDCP. The operations include the operations described above with reference to FIG. 15.

The UP IP mode can be one of (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

In at least some embodiments, referring to the example embodiment of FIG. 24, the operations further include receiving 2400 a handover command from a source radio access node. The handover command may include a command to the UE to activate the UP IP mode for a data radio bearer established with a target radio access node.

The radio access network can be a 4G network.

The radio access node, the source radio access node, and the target radio access node each can be a long term evolution eNodeB (e.g., radio access node 4500, e-UTRA Node B, 4G Node B).

Referring to FIG. 26, operations can be performed by a network node (e.g., 4600 in FIG. 46) for enabling a user plane integrity protection mode in a radio access network packet data convergence protocol (PDCP). The operations include the operations described above with reference to FIG. 26. The UP IP mode may be one of (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

Referring to FIG. 34, operations can be performed by a radio access node (e.g., 4500 in FIG. 45) for enabling a user plane integrity protection mode in a radio access network packet data convergence protocol (PDCP). The operations include the operations described above with reference to FIG. 34. The UP IP mode can include one of: (1) the UE supports user plane integrity protection in PDCP with a radio access node at a full data rate; (2) the UE supports user plane integrity protection in PDCP with the radio access node at a defined data rate that is less than the full data rate; (3) the UE supports user plane integrity protection in new radio PDCP with a gNB in a 4G network at a full data rate, and/or (4) the UE supports user plane integrity protection at a defined rate that is less than the full data rate with a gNB in a 4G network.

Figure 14:
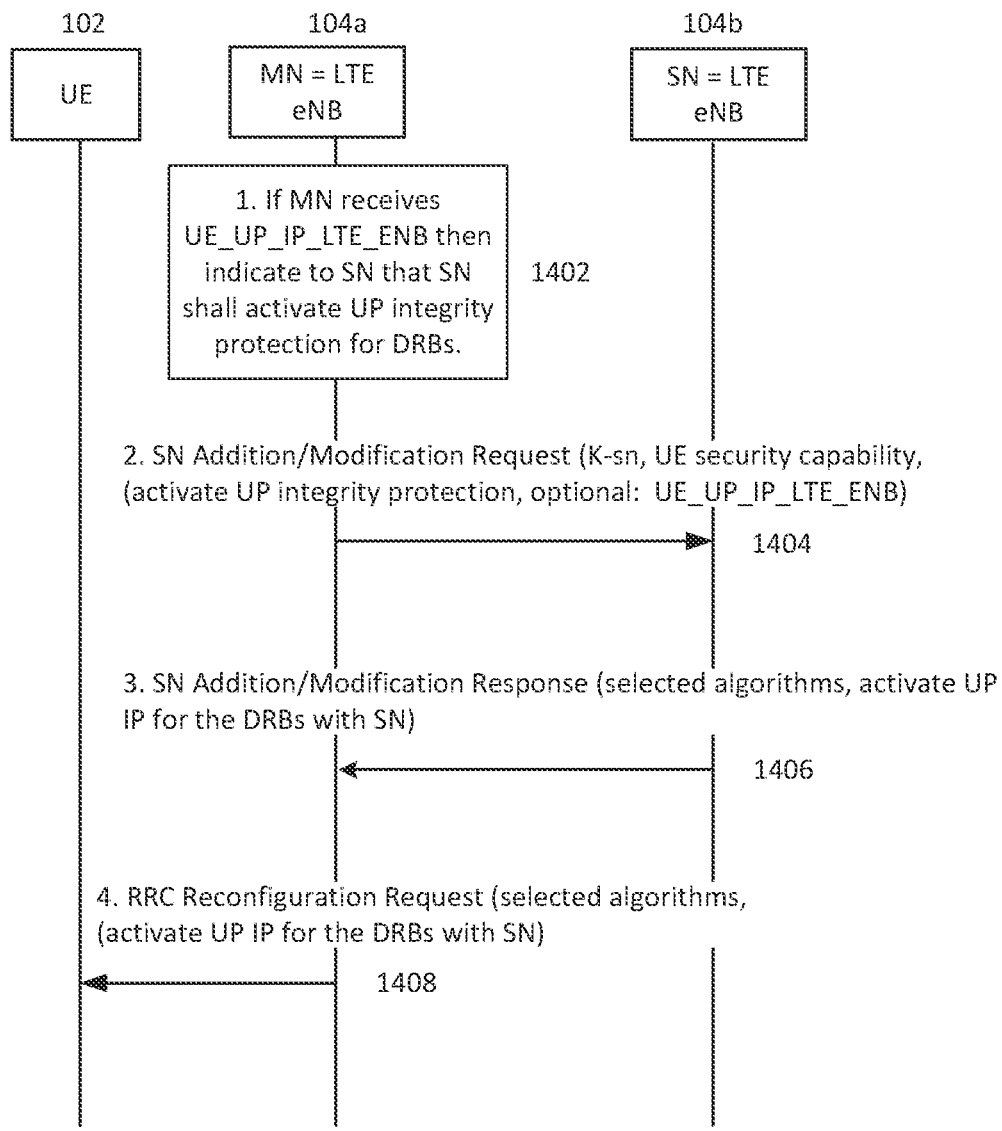
FIG. 14 illustrates operations to configure network devices during a dual connectivity where master node and secondary node are an LTE eNB—X2 interface.

In another embodiment of inventive concepts UP IP is enabled during, e.g., dual connectivity where master node and secondary node are an LTE eNB—X2 interface as illustrated in FIG. 14. As shown in FIG. 14, at 1402, if master node (MN) 104*a* receives UE_UP_IP_LTE_ENB from MME 106, then MN 104*a* indicates to secondary node (SN) 104*b* that SN 104*b* may activate UP integrity protection for DRB's.

At 1404, Master Node (MN) in Dual Connectivity (e.g. a LTE eNB 104*a*) initiates a SN Addition/Modification procedure with Secondary Node (SN) (e.g. a LTE eNB 104*b*) and indicates to SN 104*b* to activate UP integrity protection for DRB's established with UE 102 and may optionally include UE_UP_IP_LTE_ENB to SN 104*b* as well.

At 1406, SN LTE eNB 104*b* selects security algorithms and, based on the received indication to activate UP integrity protection for DRB's established with UE 102 and optionally the UE_UP_IP_LTE_ENB, SN 104*b* may decide to indicate to UE 102 to activate UP IP for DRBs established with SN 104*b* (e.g LTE eNB). SN 104*b* may send a SN Addition/Modification Response including selected algorithms and may indicate to UE 102 to activate UP IP for DRBs established with SN 104*b* (e.g. LTE eNB).

At 1408, Master Node (MN) in Dual Connectivity (LTE eNB 104*a*) initiates a RRC Reconfiguration procedure with UE 102 and forwards the information received in 1406 from SN 104*b* (e.g. LTE eNB) to UE 102.

At 1410, UE 102 activates UP IP for DRB's established with target LTE eNB 104*b*.

Figure 25:
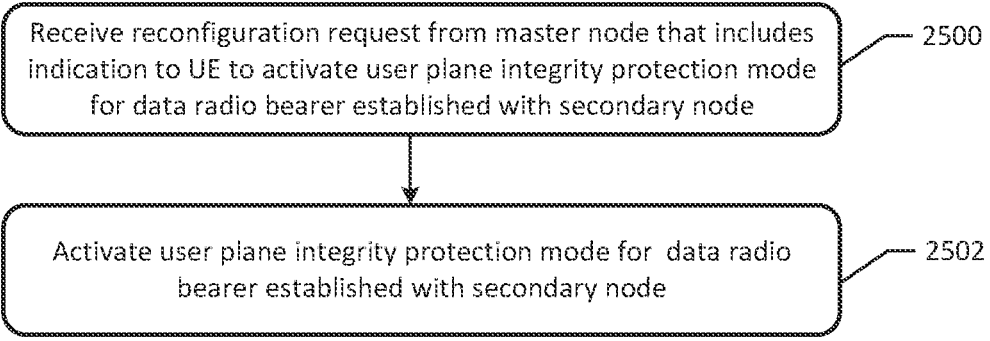
Figure 43:
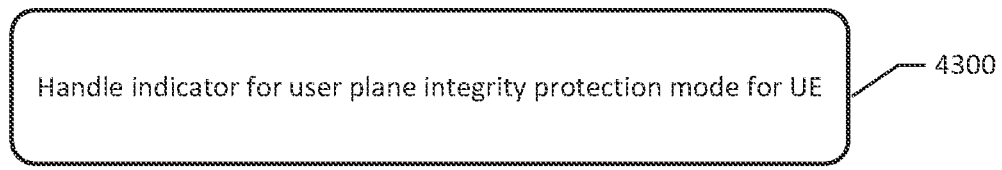
FIG. 43 is a flowchart of operations that may be performed by a radio access node, in accordance with some embodiments of the present disclosure

These and other related operations are now described in the context of the operational flowcharts of FIGS. 15, 25 and 43. FIGS. 15 and 25 are flowcharts of operations that can be performed by a UE. FIG. 43 is a flowchart of operations that can be performed by a radio access node.

Referring initially to FIG. 15, operations can be performed by a UE (e.g., 4400 in FIG. 44) for enabling user plane integrity protection of data in a radio access network PDCP. The operations include the operations described above with reference to FIG. 15.

The UP IP mode can be one of (1) the UE supports user plane integrity protection in PDCP with a radio access node at a full data rate; and (2) the UE supports user plane integrity protection in PDCP with the radio access node at a defined data rate that is less than the full data rate.

In at least some embodiments, referring to the example embodiment of FIG. 25, the operations include where the handling includes receiving 2500 a reconfiguration request from a master radio access node. The reconfiguration request includes an indication to the UE to activate the UP IP mode for a data radio bearer established with a secondary radio access node. The operations further include activating 2502 the UP IP mode for the data radio bearer established with the secondary radio access node.

The radio access network can be a 4G network.

The radio access node, the master radio access node, and the secondary radio access node each can be a long term evolution eNodeB (e.g., radio access node 4500, e-UTRA Node B, 4G Node B).

Figure 44:
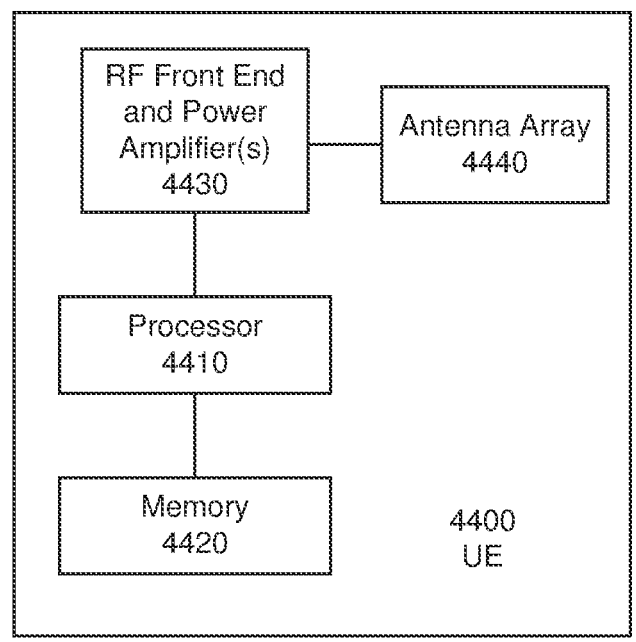
FIG. 44 is a block diagram of elements of a UE that are configured according to some embodiments of the present disclosure.

FIG. 44 is a block diagram illustrating a UE 4400 that is configured according to some embodiments. The UE 4400 can include, without limitation, a wireless terminal, a wireless communication device, a wireless communication terminal, a terminal node/UE/device, etc. The UE 4400 includes a RF front-end 4430 comprising one or more power amplifiers the transmit and receive through antennas of an antenna array 4440 to provide uplink and downlink radio communications with a radio network node (e.g., a base station, eNB, gNB, a ng-eNB, etc.) of a telecommunications network. UE 4400 further includes a processor circuit 4410 (also referred to as a processor) coupled to the RF front end 4430 and a memory circuit 4420 (also referred to as memory). The memory 4420 stores computer readable program code that when executed by the processor 4410 causes the processor 4410 to perform operations according to embodiments disclosed herein.

Figure 45:
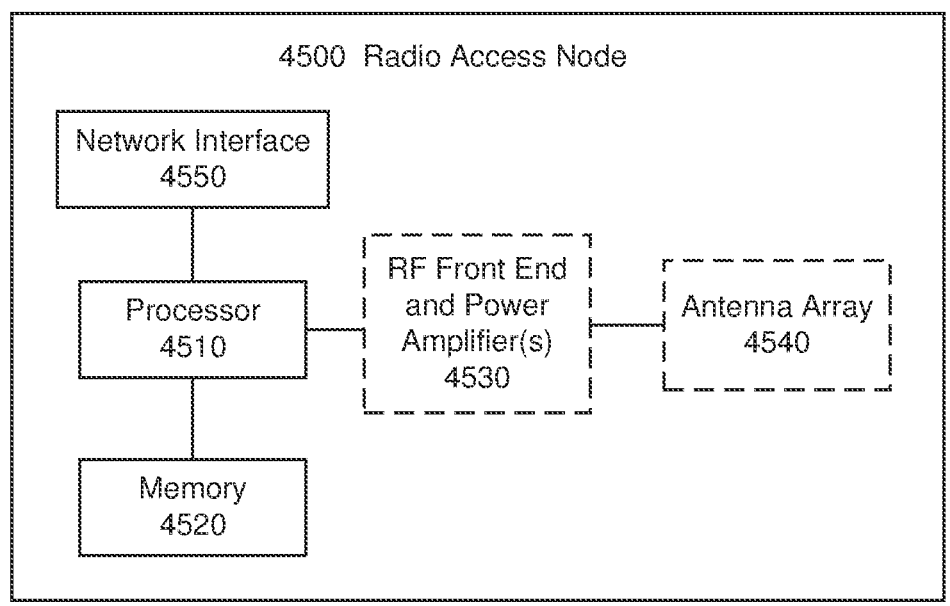
FIG. 45 is a block diagram of elements of a radio access node that are configured according to some embodiments of the present disclosure.

FIG. 45 is a block diagram illustrating a radio access node 4500 (e.g., a base station, eNB, gNB, a ng-eNB, a source node, a target, a master node, a secondary node, etc.) of a radio access network (e.g., a 4G radio access network). The radio access node 4500 includes a processor circuit 4510 (also referred to as a processor), a memory circuit 4520 (also referred to as memory), and a network interface 4550 (e.g., wired network interface and/or wireless network interface) configured to communicate with other network nodes. The radio access node 4500 may be configured as a radio network node containing a RF front end with one or more power amplifiers 4530 that transmit and receive through antennas of an antenna array 4540. The memory 4520 stores computer readable program code that when executed by the processor 4510 causes the processor 4510 to perform operations according to embodiments disclosed herein.

Figure 46:
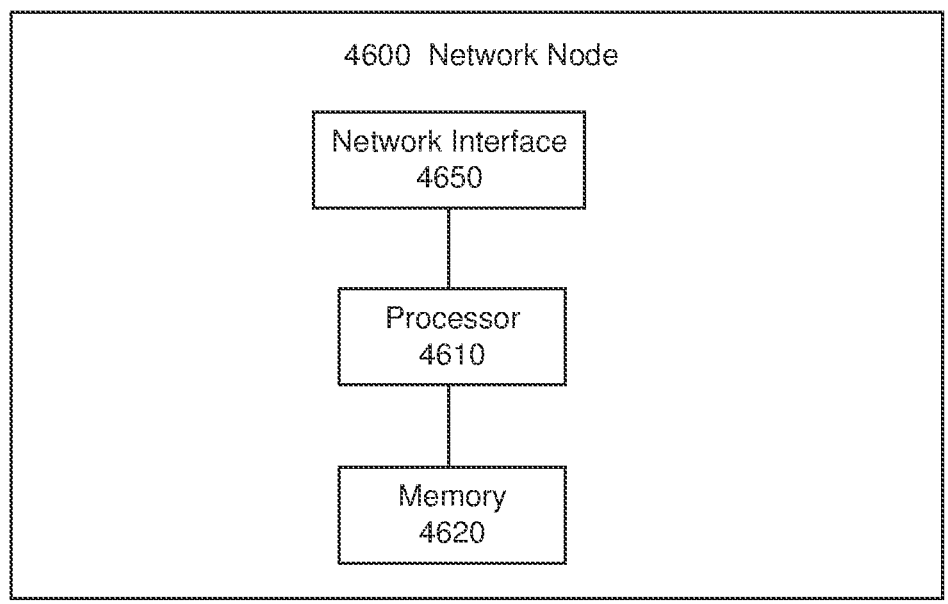
FIG. 46 is a block diagram of elements of a network node that are configured according to some embodiments of the present disclosure.

FIG. 46 is a block diagram illustrating a network node 4600 (e.g., a MME a source MME, a target MME, etc.) of a radio access network (e.g., a 4G radio access network). The network node 4600 includes a processor circuit 4610 (also referred to as a processor), a memory circuit 4620 (also referred to as memory), and a network interface 4650 (e.g., wired network interface and/or wireless network interface) configured to communicate with other network nodes. The memory 4620 stores computer readable program code that when executed by the processor 4610 causes the processor 4610 to perform operations according to embodiments disclosed herein.

Figure 47:
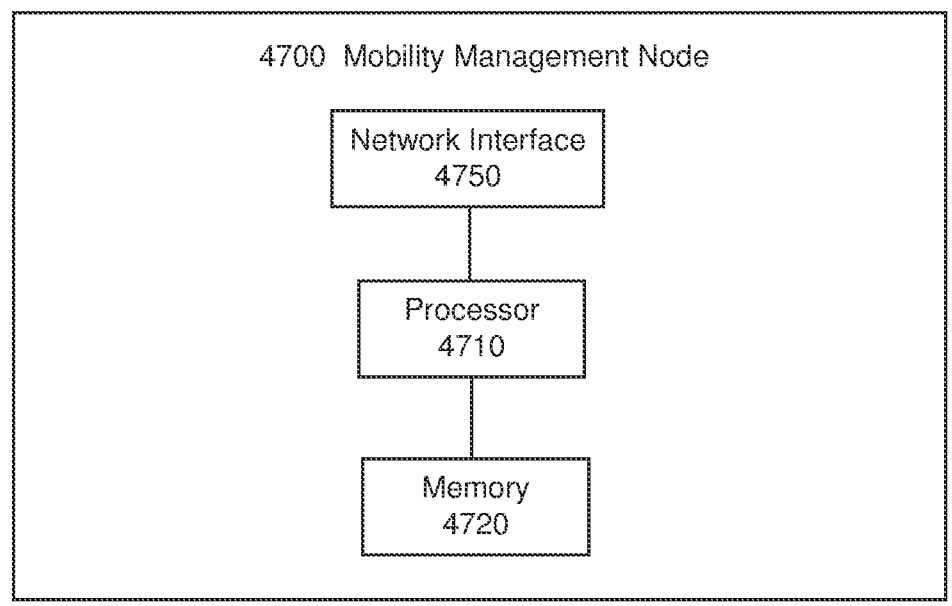
FIG. 47 is a block diagram of elements of a mobility management node that are configured according to some embodiments of the present disclosure.

FIG. 47 is a block diagram illustrating a mobility management node 4700 (e.g., a MME, a source MME, a target MME, etc.) of a radio access network (e.g., a 4G radio access network). The access and mobility node 4700 includes a processor circuit 4710 (also referred to as a processor), a memory circuit 4720 (also referred to as memory), and a network interface 4750 (e.g., wired network interface and/or wireless network interface) configured to communicate with other network nodes. The memory 4720 stores computer readable program code that when executed by the processor 4710 causes the processor 4710 to perform operations according to embodiments disclosed herein.

References include TS 33.501 and TS 23.401.

LISTING OF EMBODIMENTS

Example Embodiments are discussed below. Reference numbers/letters are provided in parenthesis by way of example/illustration without limiting example embodiments to particular elements indicated by reference numbers/letters.

Embodiment 1. A method performed by a user equipment, UE, for enabling a user plane integrity protection mode in a radio access network packet data convergence protocol, PDCP. The method includes providing an indication of a user plane integrity protection mode supported by the UE. The user plane integrity protection mode (UP IP mode) includes one of: the UE supports user plane integrity protection in PDCP with a radio access node at a full data rate; the UE supports user plane integrity protection in PDCP with the radio access node at a defined data rate that is less than the full data rate; the UE supports user plane integrity protection in new radio PDCP with a gNB in a 4G network at a full data rate, and the UE supports user plane integrity protection at a defined rate that is less than the full data rate with a gNB in a 4G network.

Embodiment 2. The method of Embodiment 1, further including sending (1600) an attach request to a core node that includes the indication of the UP IP mode supported by the UE.

Embodiment 3. The method of any of Embodiments 1 to 2, further including receiving (1700) an activation message from a receiving node that includes an indication to the UE to activate the UP IP mode.

Embodiment 4. The method of any of Embodiments 1 to 3, wherein the sending the attach request further includes sending (2100) the attach request that includes a default radio bearer setup; and wherein receiving the activation message further includes an indication to the UE to activate the UP IP mode for a data radio bearer established with the receiving node.

Embodiment 5. The method of Embodiment of 2, wherein the sending the attach request does not include a default radio bearer setup. The method further includes receiving (1800) a message from a receiving node to initiate a security mode procedure with the UE where no data radio bearer with the UE is established.

Embodiment 6. The method of Embodiment 5, further including establishing (1900) a secure packet data network connection with a core node to establish a data radio bearer with the network. The method further includes receiving (1902) a message from the receiving node that includes an indication to the UE to activate the UP IP mode for the data radio bearer established with the receiving node.

Embodiment 7. The method of Embodiment 1, further including receiving (2000) a handover command message from a long term evolution e Node B that includes an indication to the UE to activate the user plane integrity protection for a data radio bearer established with a new radio access node.

Embodiment 8. The method of Embodiment 2, further including establishing (2200) a secure network connection with a core node. The method further includes receiving (2202) a message from a long term evolution e Node B that includes an indication to the UE to activate the UP IP mode for the data radio bearer established with the long term evolution e Node B.

Embodiment 9. The method of Embodiment 1, further including sending (2300) an attach request to a target core node that includes the indication of the UP IP mode supported by the UE. The method further includes, if the attach request was not successfully integrity protected, receiving (2302) a request from the target core node to resend the attach request that includes the indication of the UP IP mode supported by the UE.

Embodiment 10. The method of Embodiment 1, further including receiving (2400) a handover command from a source radio access node. The handover command includes a command to the UE to activate the UP IP mode for a data radio bearer established with a target radio access node.

Embodiment 11. The method of Embodiment 1, further comprising receiving (2500) a reconfiguration request from a master radio access node, wherein the reconfiguration request includes an indication to the UE to activate the UP IP mode for a data radio bearer established with a secondary radio access node. The method further includes activating (2502) the UP IP mode for the data radio bearer established with the secondary radio access node.

Embodiment 12. The method of any of Embodiments 1 to 11, wherein the radio access network is a 4G network.

Embodiment 13. A method performed by network node for enabling a user plane integrity protection mode in a radio access network packet data convergence protocol, PDCP, is provided. The method includes handling (2600) an indication of a user plane integrity protection mode supported by a user equipment, UE. The user plane integrity protection mode (UP IP mode) includes one of: the UE supports user plane integrity protection in PDCP with the radio access node at a full data rate; the UE supports user plane integrity protection in PDCP with the radio access node at a defined data rate that is less than the full data rate; the UE supports user plane integrity protection in new radio PDCP with a gNB in a 4G network at a full data rate, and the UE supports user plane integrity protection at a defined rate that is less than the full data rate with a gNB in a 4G network.

Embodiment 14. The method of Embodiment 13, wherein the handling includes receiving (2700) an attach request from the UE that includes the indication of the UP IP mode supported by the UE. The method further includes, responsive to the attach request, establishing (2702) a secure connection between the UE and the radio access network. The method further includes sending (2704) a message to a long term evolution e Node B that includes the indication of the UP IP mode.

Embodiment 15. The method of Embodiment 13, wherein the handling includes receiving (3500) an attach request that includes the indication of the UP IP mode and includes a default bearer setup. The method further includes, responsive to the attach request, establishing (3502) a secure connection between the UE and the radio access network. The method further includes sending (3504) a message to a long term evolution e Node B that includes the indication of the UP IP mode.

Embodiment 16. The method of Embodiment 15, further including receiving (2802) a packet data network connection establishment request from the UE to establish a data bearer with the radio access network. The method further includes creating (2804) a session with the gateway node to establish the default bearer with the UE. The method further includes, responsive to establishing the default bearer, sending (2806) a message to the long term evolution eNodeB that includes the indication of the UP IP mode supported by the UE.

Embodiment 17. The method of any of Embodiments 15 to 16, wherein receiving the attach request does not include a default radio bearer setup; and further including sending (2900) a message to the long term evolution eNode B to initiate a context setup procedure with the long term evolution eNode B, wherein the message includes providing the UP IP mode of the UE to the long term evolution eNode B.

Embodiment 18. The method of any of Embodiments 15 to 17, wherein the UP IP mode is one of (1) the UE supports user plane integrity protection in new radio PDCP with a gNB in a 4G network at a full data rate and (2) the UE supports user plane integrity protection at a defined rate that is less than the full data rate with a gNB in a 4G network. The method further includes establishing (3000) a secure packet data network connection with the UE to establish a data radio bearer with the radio access network. The method further includes creating (3002) a session procedure with a gateway node to establish a default bearer with the UE. The method further includes initiating (3004) a context setup procedure with the receiving node that includes the indication of the UP IP mode supported by the UE.

Embodiment 19. The method of any of any of Embodiments 13 to 18, wherein the network node is mobility management node.

Embodiment 20. The method of Embodiment 14, further including requesting (3100) a location update from a core network server. The method further includes receiving (3102) from the core network server a location update response message that includes subscription data information for the UE as the user plane integrity protection policy. The method further includes storing (3104) the user plane integrity protection policy in the network node. The method further includes deciding (3106) that the user plane integrity protection policy takes precedence over the indication of the UP IP mode received in the attach request. The method further includes creating (3108) a session procedure with the core network to establish a default bearer with the UE. The method further includes sending (3110) a message to a long term evolution eNode B that includes the UP IP mode for the UE and the user plane integrity protection policy.

Embodiment 21. The method of Embodiment 20, further including sending (3200) a message to a source core node that includes the complete attach request. The method further includes receiving (3202) a response to the message. The response provides the UP IP mode of the UE to the target core node when the attach request is successfully authenticated. The method further includes, if the attach request was not successfully integrity protected, sending (3204) a request to the UE to resend the attach request that includes the indication of the UP IP mode supported by the UE.

Embodiment 22. The method of Embodiment 14, further including receiving (3300) a handover request from a source node. The method further includes forwarding (3302) (1) the handover request to a source core node and (2) the UP IP mode for the UE if the UP IP mode for the UE is stored in the target core node. The method further includes sending (3304) a handover command request to a target node, wherein the handover command request includes the UP IP mode if it is stored in the target core node. The method further includes sending (3306) the UP IP mode to the source node.

Embodiment 23. A method performed by a radio access node for enabling a user plane integrity protection mode in a radio access network packet data convergence protocol, PDCP, is provided. The method includes receiving (3400) a message from a network node that includes an indication of the user plane integrity protection mode supported by a user equipment, UE. The user plane integrity protection mode (UP IP mode) includes one of: the UE supports user plane integrity protection in PDCP with a long term evolution eNode B radio access node at a full data rate; the UE supports user plane integrity protection in PDCP with the long term evolution eNode B at a defined data rate that is less than the full data rate; the UE supports user plane integrity protection in new radio PDCP with a gNB in a 4G network at a full data rate, and the UE supports user plane integrity protection at a defined rate that is less than the full data rate with a gNB in a 4G network.

Embodiment 24. The method of Embodiment 23, wherein the receiving includes receiving (3600) the UP IP Mode during a security mode command procedure.

Embodiment 25. The method of Embodiment 23, further including sending (3700) a message to the UE that includes an indication to the UE to activate the UP IP mode.

Embodiment 26. The method of any of Embodiments 23 to 25, wherein the core node is a mobility management node.

Embodiment 27. The method of any of Embodiments 23 to 25, wherein the radio access node is a long term evolution eNode B.

Embodiment 28. The method of any of Embodiments 23 to 27, wherein the radio access network is a 4G network.

Embodiment 29. The method of Embodiment 23, further including, if the UP IP mode is received from the core node, indicating (3800) to a new radio access node that the new radio access node should activate the UP IP mode for a data radio bearer established with the UE. The method further includes sending (3802) a request to the new radio access node for the new radio access node to activate the UP IP mode for the data radio bearer established with the UE. The method further includes receiving (3804) a response from the new radio access node that indicates that the UP IP mode for the data radio bearer established with the UE will be activated. The method further includes initiating (3806) a reconfiguration procedure with the UE that includes indicating to the UE to activate the UP IP mode for the data radio bearer established with the new radio access node.

Embodiment 30. The method of any of Embodiments 23 to 25, further including determining (3900) a UP IP mode based on if the radio access node receives a user plane integrity protection policy from the core node that indicates that UP IP mode for the data radio bearer should be activated. The method further includes, responsive to receipt of the policy indicating that UP IP mode should be activated, activating (3902) the UP IP mode for the data radio bearer.

Embodiment 31. The method of Embodiment 29, further including providing (4000) the received user plane integrity protection policy to the new radio access node.

Embodiment 32. The method of claim 30, further including deciding (4100) from the UP IP mode together with the user plane integrity protection policy whether the UP IP mode for a data radio bearer should be activated. The method further includes sending (4102) the decision to the new radio access node.

Embodiment 33. A method performed by a network node for enabling a user plane integrity protection mode for the UE during a mobility handover procedure in a radio access network is provided. The method includes handling (4200) an indicator for a user plane integrity protection mode for a user equipment, UE. The user plane integrity protection mode (UP IP mode) includes one of: the UE supports user plane integrity protection in PDCP with a long term evolution eNode B radio access node at a full data rate; the UE supports user plane integrity protection in PDCP with the long term evolution eNode B at a defined data rate that is less than the full data rate; the UE supports user plane integrity protection in new radio PDCP with a gNB in a 4G network at a full data rate, and the UE supports user plane integrity protection at a defined rate that is less than the full data rate with a gNB in a 4G network.

Embodiment 34. The method of Embodiment 33, wherein the handling includes receiving a handover command from a target mobility management node that includes the UP IP mode for the UE if the UP IP mode for the UE is stored in the target mobility management node.

Embodiment 35. The method of Embodiment 33, wherein the mobility management node is a source mobility management node.

Embodiment 36. The method of Embodiment 33, wherein the handling includes receiving a handover command request from a source mobility management node. The handover command request includes the UP IP mode for the UE. The method further includes sending a handover command response to the source mobility management node and, based on the UP IP mode, indicates to the UE to activate the UP IP mode for a data radio bearer established with the mobility management node.

Embodiment 37. The method of Embodiment 35, wherein the mobility management node is a target mobility management node.

Embodiment 38. A method performed by a master radio access node for enabling a user plane integrity protection mode in a radio access network packet data convergence protocol, PDCP, is provided. The method includes handling (4300) a user plane protection mode for a user equipment, UE. The user plane integrity protection mode (UP IP mode) includes one of: the UE supports user plane integrity protection in PDCP with a long term evolution eNode B radio access node at a full data rate; the UE supports user plane integrity protection in PDCP with the long term evolution eNode B at a defined data rate that is less than the full data rate.

Embodiment 39. The method of Embodiment 38, wherein the handling includes receiving the UP IP mode from a core node. The method further includes, responsive to the receiving, sending an indication to a secondary radio access node that the secondary radio access node should activate the UP IP mode for a data radio bearer. The method further includes sending a request to the secondary radio access node to initiate an addition or modification procedure with the secondary radio access node, wherein the request indicates to the secondary radio access node to activate the UP IP mode for a data radio bearer established with the UE. The method further includes receiving an addition or modification response from the secondary radio access node that includes an indication to the UE to activate the UP IP mode for the data radio bearer established with the secondary radio access node. The method further includes forwarding the complete addition or modification response received from the secondary radio access node to the UE.

Embodiment 40. The method of any of Embodiments 38 to 39, wherein the master radio access node is a long term evolution eNode B.

Embodiment 41. The method of Embodiment 39, wherein the secondary radio access node is a long term evolution eNode B.

Embodiment 42. The method of any of Embodiments 38 to 41, wherein the radio access network is a 4G network.

Embodiment 43. A user equipment (4400) for enabling a user plane integrity protection mode in a radio access network packet data convergence protocol, PDCP, is provided. The user equipment includes a processor (4410); and a memory (4420) coupled to the processor, wherein the memory stores instructions that when executed by the processor causes the processor to perform operations according to any of Embodiments 1 to 22.

Embodiment 44. A computer program product, including non-transitory computer readable storage medium comprising computer readable program code embodied in the medium that when executed by a processor (4410) of a user equipment (4400) causes the processor to perform operations according to any of Embodiments 1 to 22.

Embodiment 45. A radio access node (4500) for enabling a user plane integrity protection mode in a radio access network packet data convergence protocol, PDCP, is provided. The radio access node including a processor (4510); and a memory (4520) coupled to the processor, wherein the memory stores instructions that when executed by the processor causes the processor to perform operations according to any of Embodiments 22 to 32.

Embodiment 46. A computer program product, including non-transitory computer readable storage medium including computer readable program code embodied in the medium that when executed by a processor (4510) of a user equipment (4500) causes the processor to perform operations according to any of Embodiments 22 to 32.

Embodiment 47. A network node (4600) for enabling a user plane integrity protection mode in a radio access network packet data convergence protocol, PDCP, is provide. The radio access node including a processor (4610); and a memory (4620) coupled to the processor, wherein the memory stores instructions that when executed by the processor causes the processor to perform operations according to any of Embodiments 33 to 37.

Embodiment 48. A computer program product, including non-transitory computer readable storage medium including computer readable program code embodied in the medium that when executed by a processor (4610) of a network node (4600) causes the processor to perform operations according to any of Embodiments 33 to 37.

Embodiment 49. A master radio access node (4500) for enabling a user plane integrity protection mode in a radio access network packet data convergence protocol, PDCP, is provided. The master radio access node including a processor (4510); and a memory (4520) coupled to the processor, wherein the memory stores instructions that when executed by the processor causes the processor to perform operations according to any of Embodiments 38 to 42.

Embodiment 50. A computer program product, including non-transitory computer readable storage medium including computer readable program code embodied in the medium that when executed by a processor (4510) of a master radio access node (4400) causes the processor to perform operations according to any of Embodiments 38 to 42.

Further Definitions and Embodiments are Discussed Below:

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality)

and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional Explanation is Provided Below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 48:
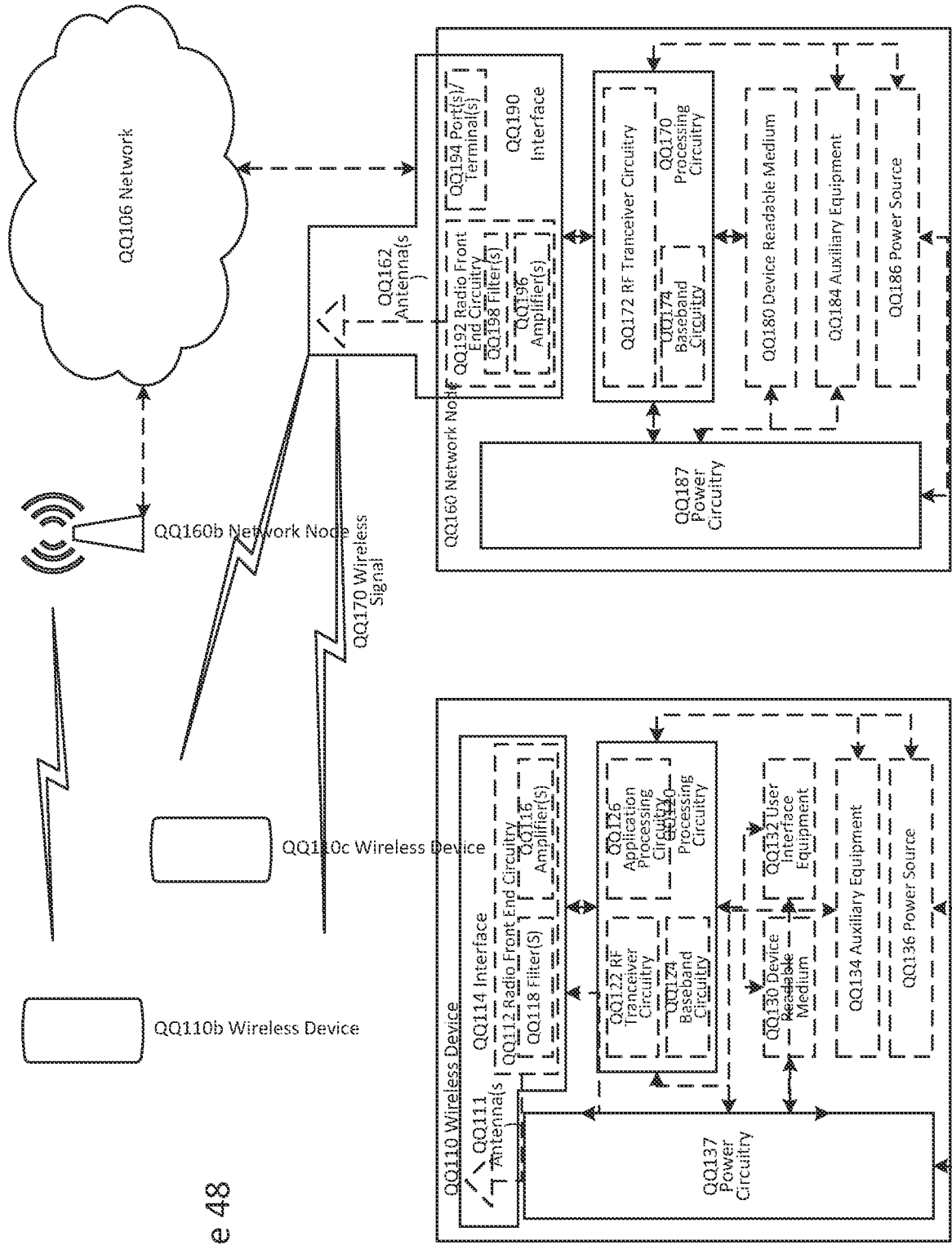
FIG. 48 is a block diagram of a wireless network in accordance with some embodiments of the present disclosure.

FIG. 48: A Wireless Network in Accordance With Some Embodiments.

Although the subject matter described herein may be implemented in any appropriate type of system using any suitable components, the embodiments disclosed herein are described in relation to a wireless network, such as the example wireless network illustrated in FIG. 48. For simplicity, the wireless network of FIG. 48 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 48, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 48 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 48 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE or other terminal implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 49:
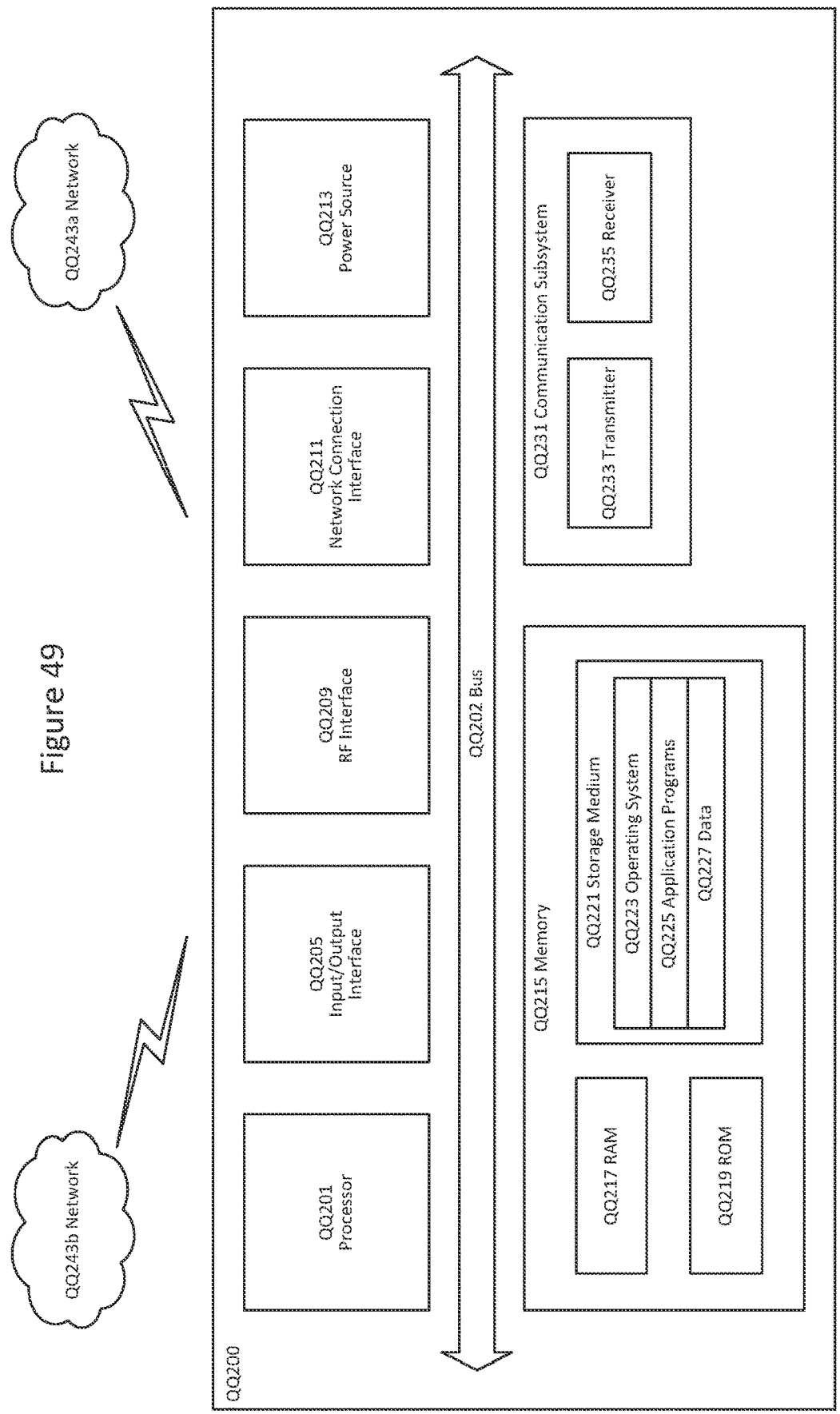
FIG. 49 is a block diagram of a user equipment or other terminal in accordance with some embodiments of the present disclosure.

FIG. 49: User Equipment in Accordance With Some Embodiments

FIG. 49 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 49, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 49 is a UE, the components discussed herein are equally applicable to a WD, and vice-versa.

In FIG. 49, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 49, or only a subset of the components. The level of integration between the components may vary from one UE to another UE. Further, certain UEs may contain multiple instances of a component, such as multiple processors, memories, transceivers, transmitters, receivers, etc.

In FIG. 49, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 49, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 49, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 50:
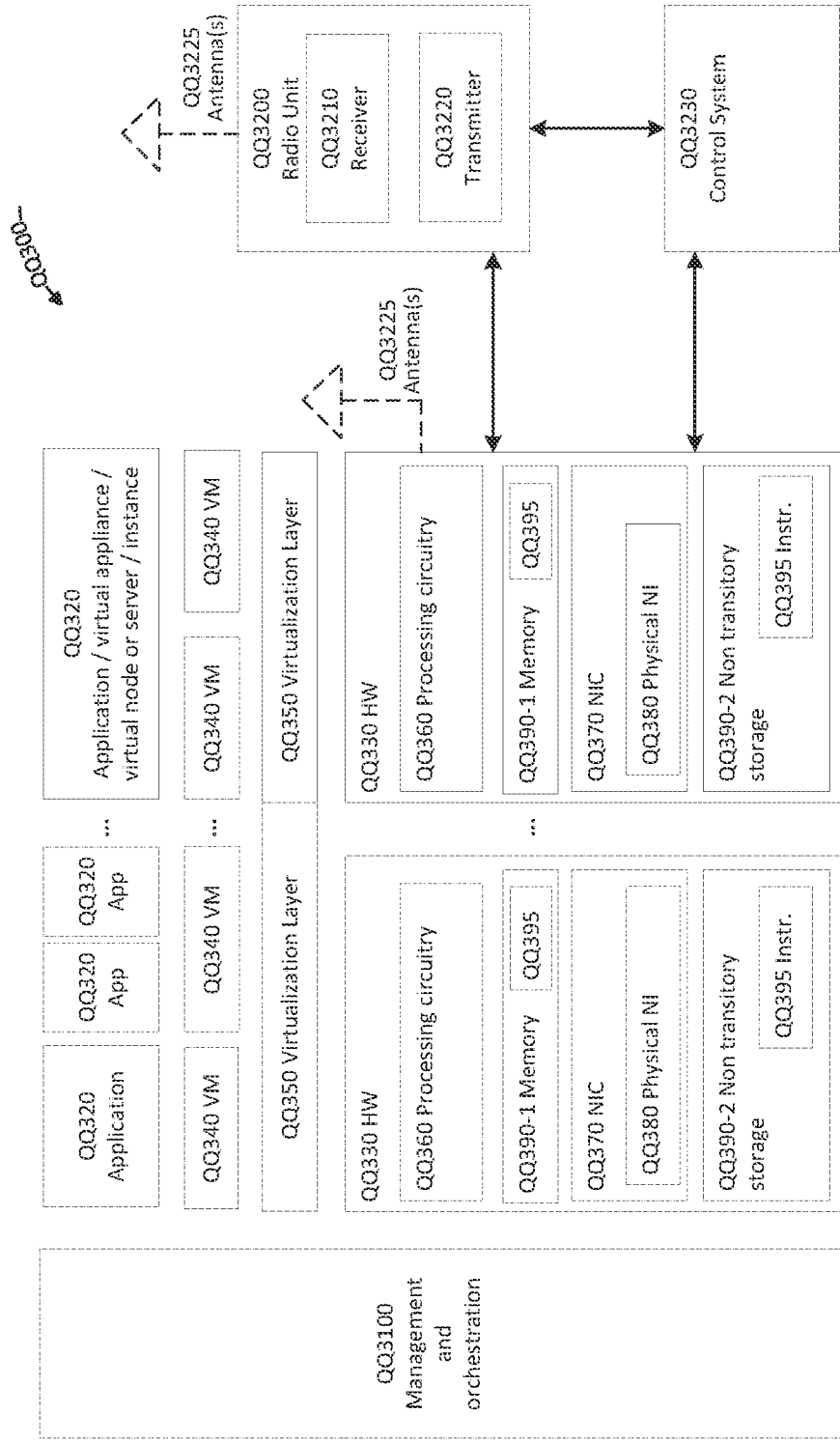
FIG. 50 is a block diagram of a virtualization environment in accordance with some embodiments of the present disclosure.

FIG. 50: Virtualization Environment in Accordance With Some Embodiments

FIG. 50 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 50, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 50.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 51:
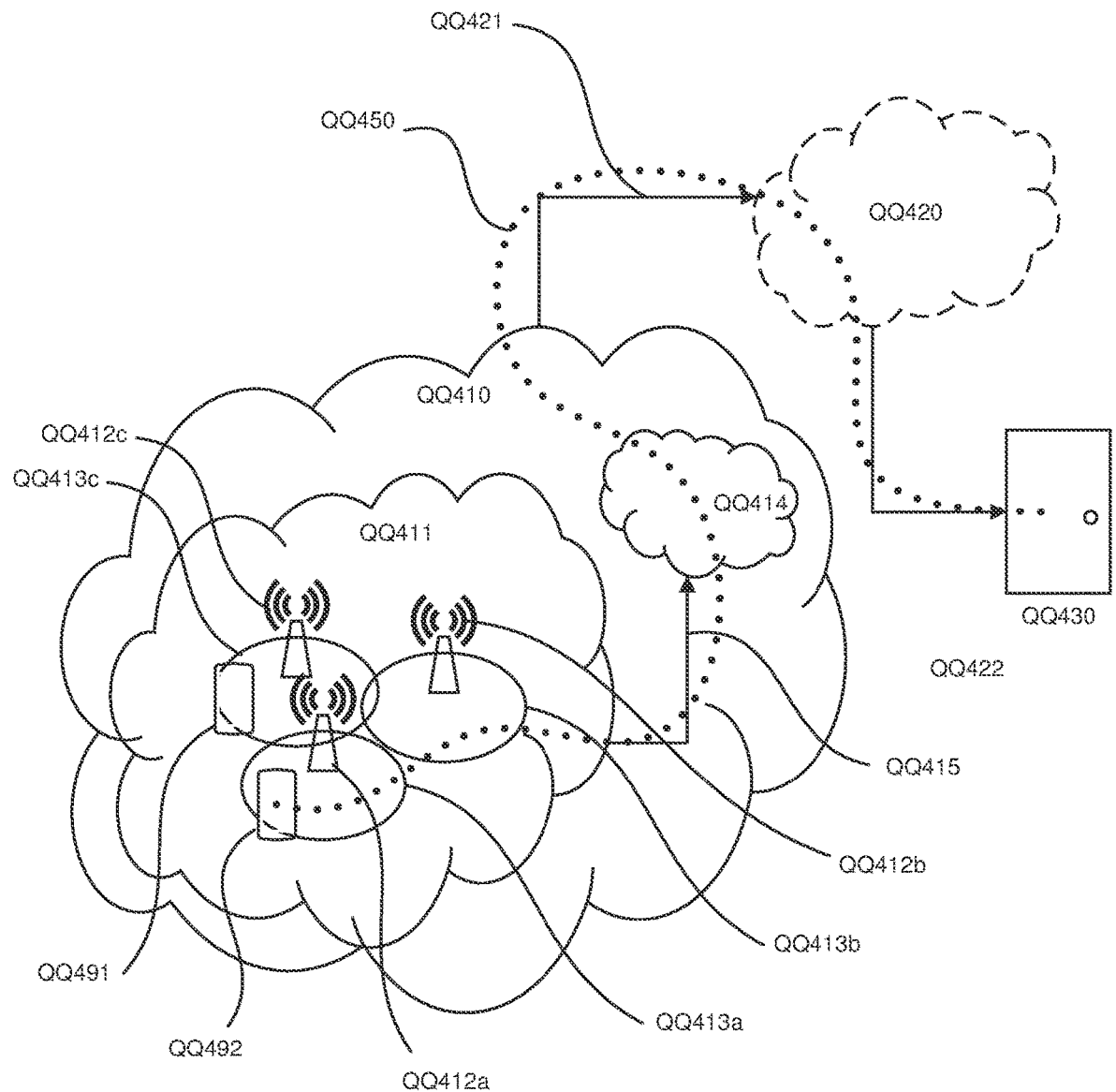
FIG. 51 is a block diagram of a telecommunication network connected via an intermediate network to a host computer in accordance with some embodiments of the present disclosure.

FIG. 51: Telecommunication Network Connected Via an Intermediate Network to a Host Computer in Accordance With Some Embodiments.

With reference to FIG. 51, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 51 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 52:
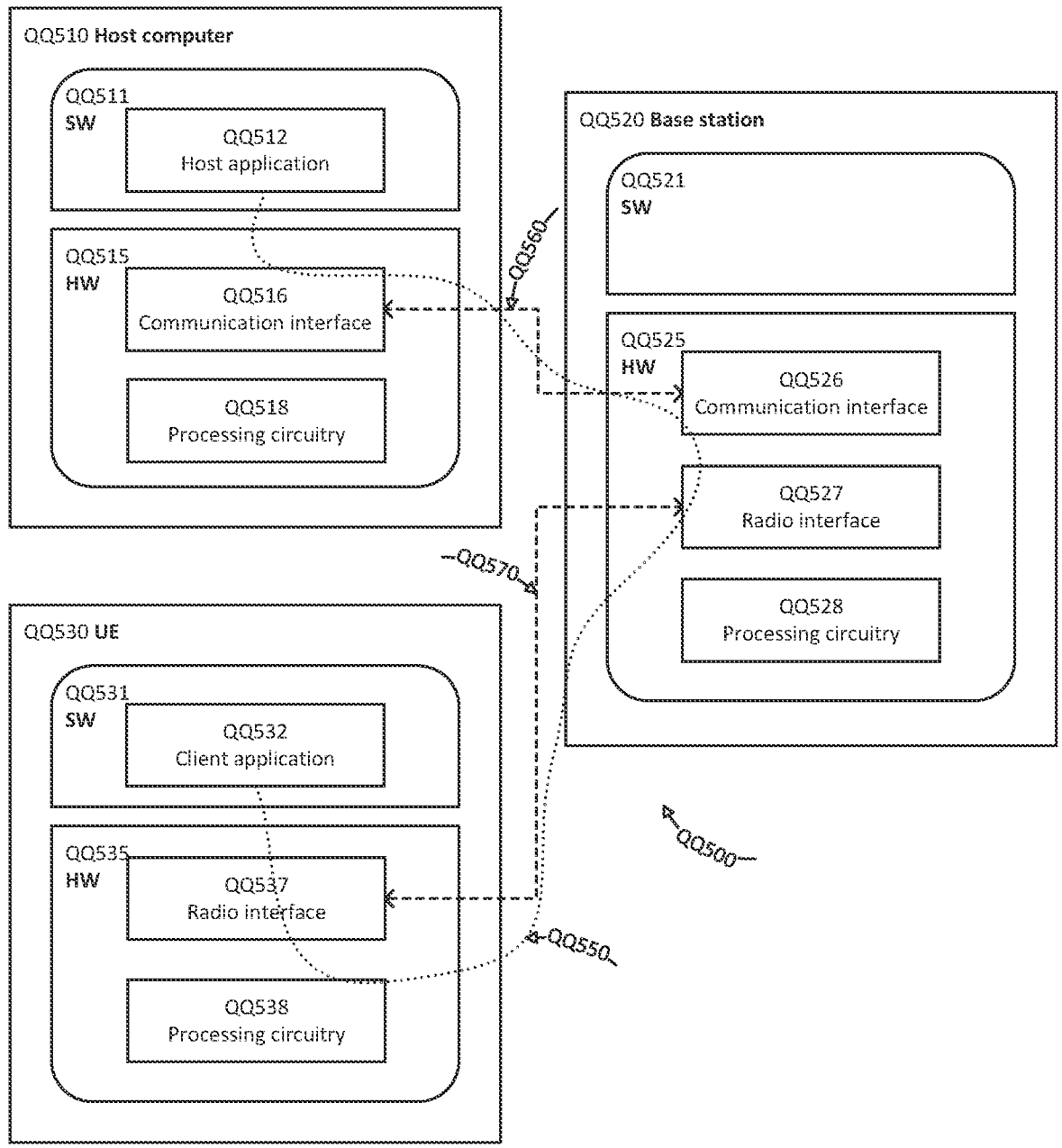
FIG. 52 is a block diagram of a host computer communicating via a base station with a user equipment user equipment or other terminal over a partially wireless connection in accordance with some embodiments of the present disclosure.

FIG. 52: Host Computer Communicating Via a Base Station With a User Equipment Over a Partially Wireless Connection in Accordance With Some Embodiments.

Example implementations, in accordance with an embodiment, of the UE, base station and host computer discussed in the preceding paragraphs will now be described with reference to FIG. 52. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 52) served by base station QQ520. Communication interface QQ526 may be configured to facilitate connection QQ560 to host computer QQ510. Connection QQ560 may be direct or it may pass through a core network (not shown in FIG. 52) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 52 may be similar or identical to host computer QQ430, one of base stations QQ412a, QQ412b, QQ412c and one of UEs QQ491, QQ492 of FIG. 51, respectively. This is to say, the inner workings of these entities may be as shown in FIG. 52 and independently, the surrounding network topology may be that of FIG. 51.

In FIG. 52, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 53:
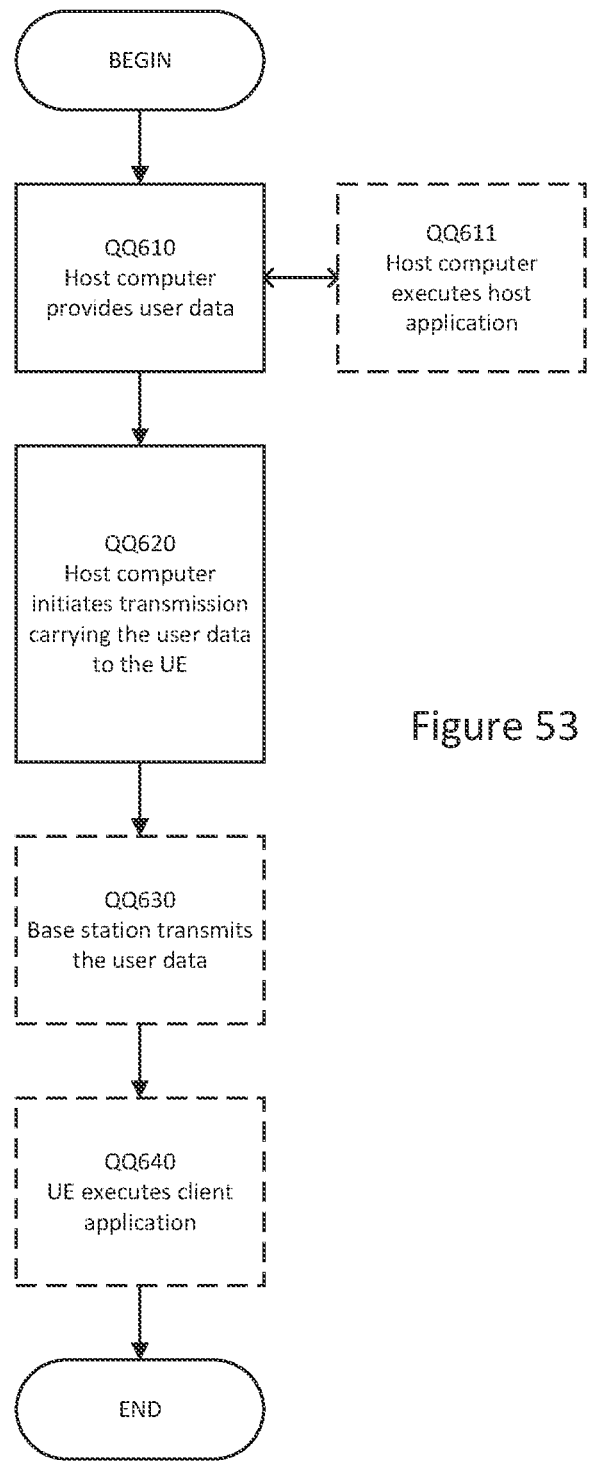
FIG. 53 is a block diagram of methods implemented in a communication system including a host computer, a base station and a user equipment user equipment or other terminal in accordance with some embodiments of the present disclosure.

FIG. 53: Methods Implemented in a Communication System Including a Host Computer, a Base Station and a User Equipment in Accordance With Some Embodiments.

FIG. 53 is a flowchart illustrating a method implemented in a communication system, in accordance with one embodiment. The communication system includes a host computer, a base station and a UE which may be those described with reference to FIGS. 51 and 52. For simplicity of the present disclosure, only drawing references to FIG. 53 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 54:
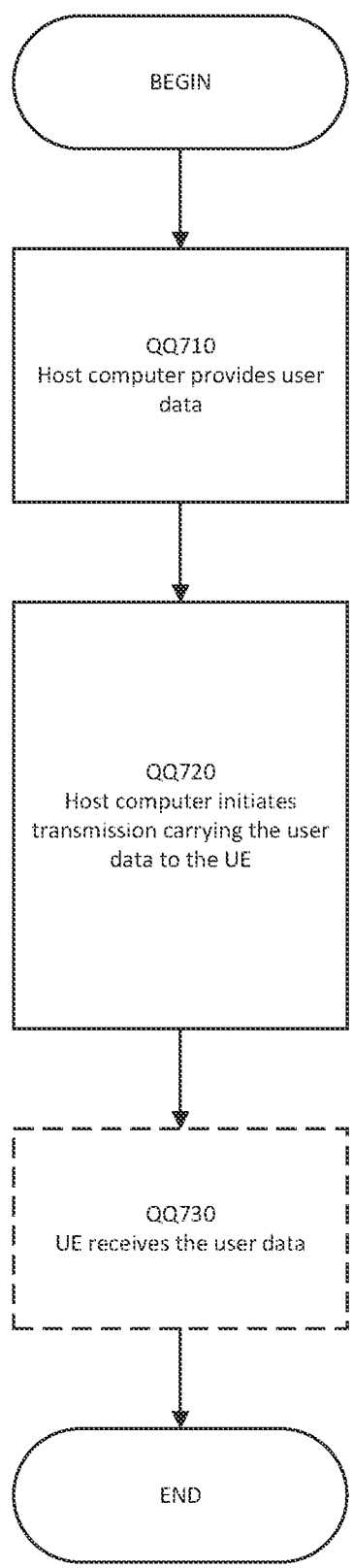
FIG. 54 is a block diagram of methods implemented in a communication system including a host computer, a base station and a user equipment user equipment or other terminal in accordance with some embodiments of the present disclosure.

FIG. 54: Methods Implemented in a Communication System Including a Host Computer, a Base Station and a User Equipment in Accordance With Some Embodiments.

FIG. 54 is a flowchart illustrating a method implemented in a communication system, in accordance with one embodiment. The communication system includes a host computer, a base station and a UE which may be those described with reference to FIGS. 51 and 52. For simplicity of the present disclosure, only drawing references to FIG. 54 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 55:
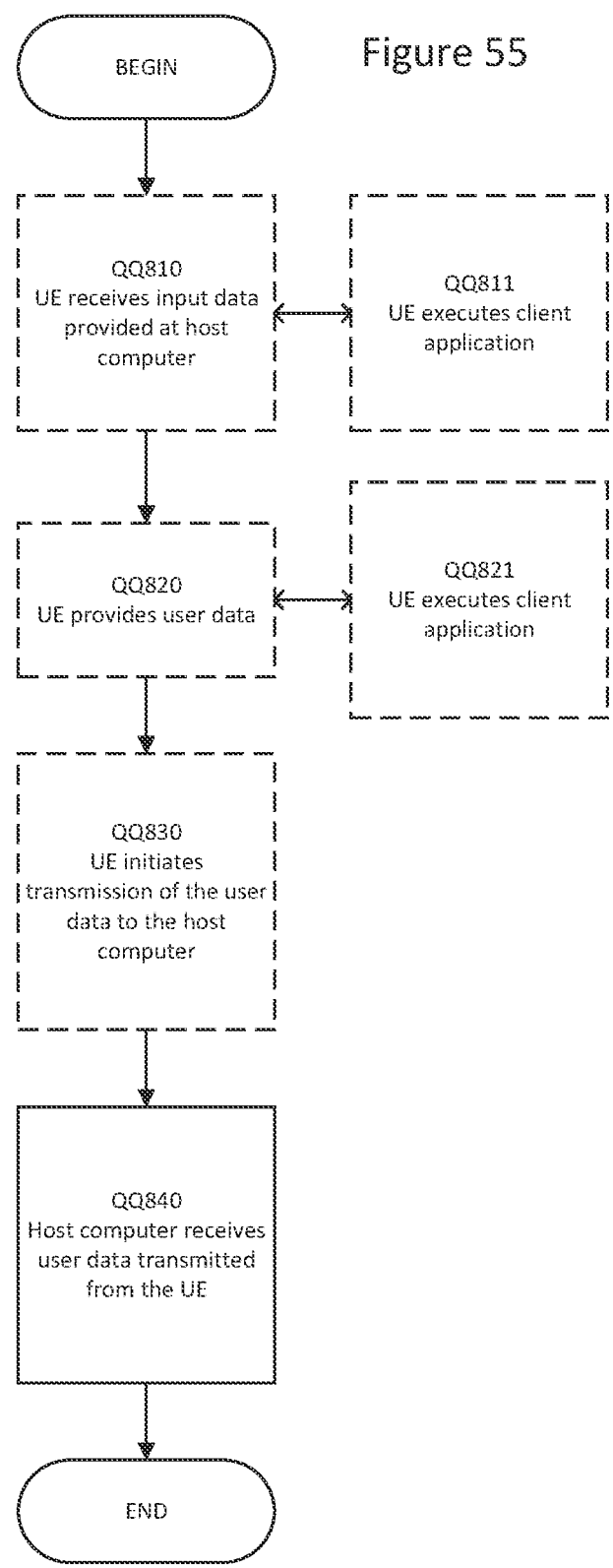
FIG. 55 is a block diagram of methods implemented in a communication system including a host computer, a base station and a user equipment user equipment or other terminal in accordance with some embodiments of the present disclosure.

FIG. 55: Methods Implemented in a Communication System Including a Host Computer, a Base Station and a User Equipment in Accordance With Some Embodiments.

FIG. 55 is a flowchart illustrating a method implemented in a communication system, in accordance with one embodiment. The communication system includes a host computer, a base station and a UE which may be those described with reference to FIGS. 51 and 52. For simplicity of the present disclosure, only drawing references to FIG. 55 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 56:
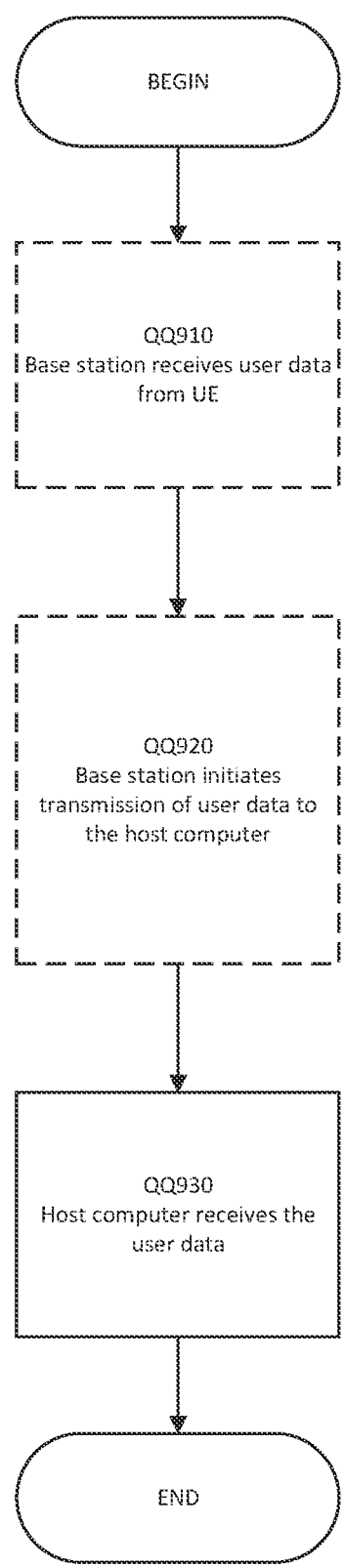
FIG. 56 is a block diagram of methods implemented in a communication system including a host computer, a base station and a user equipment user equipment or other terminal in accordance with some embodiments of the present disclosure.

FIG. 56: Methods Implemented in a Communication System Including a Host Computer, a Base Station and a User Equipment in Accordance With Some Embodiments.

FIG. 56 is a flowchart illustrating a method implemented in a communication system, in accordance with one embodiment. The communication system includes a host computer, a base station and a UE which may be those described with reference to FIGS. 51 and 52. For simplicity of the present disclosure, only drawing references to FIG. 56 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by an E-UTRA-NR Dual Connectivity (EN-DC) capable user equipment, UE, for enabling a user plane integrity protection mode in a New Radio (NR) packet data convergence protocol (PDCP) the method comprising:
providing an indication of a user plane integrity protection, UP IP, mode supported by the UE with respect to a 4G system;
sending an attach request to a Mobility Management Entity (MME) that includes the indication of the UP IP mode supported by the UE; and
receiving an activation message from an eNodeB that includes an indication to the UE to activate the UP IP mode for a data radio bearer established between the UE and the eNodeB.

2. The method of claim 1, wherein the sending the attach request further comprises sending the attach request that includes a default radio bearer setup; and
wherein receiving the activation message further includes an indication to the UE to activate the UP IP mode for the data radio bearer established between the UE and the eNodeB.

3. The method of claim 1, wherein the sending the attach request does not include a default radio bearer setup; and further comprising:
receiving a message from a receiving node to initiate a security mode procedure with the UE where no data radio bearer with the UE is established.

4. The method of claim 1, further comprising:
receiving a handover command from a source radio access node, wherein the handover command includes a command to the UE to activate the UP IP mode for a data radio bearer established with a target radio access node.

5. The method of claim 1, further comprising:
receiving a reconfiguration request from a master radio access node, wherein the reconfiguration request includes an indication to the UE to activate the UP IP mode for a data radio bearer established with a secondary radio access node; and
activating the UP IP mode for the data radio bearer established with the secondary radio access node.

6. A method performed by a Mobility Management Entity (MME) for enabling a user plane integrity protection mode in a New Radio (NR) packet data convergence protocol, PDCP, the method comprising:
handling an indication of a user plane integrity protection mode supported by an E-UTRA-NR Dual Connectivity (EN-DC) capable user equipment, UE, with respect to a 4G system;
receiving an attach request from the UE that includes the indication of the UP IP mode supported by the UE;

responsive to the attach request, establishing a secure connection between the UE and the radio access network; and sending a message to a long term evolution eNode B that includes the indication of the UP IP mode.

7. The method of claim 6, wherein the handling comprises:

receiving an attach request that includes the indication of the UP IP mode and includes a default bearer setup;

responsive to the attach request, establishing a secure connection between the UE and the radio access network; and sending a message to long term evolution eNode B that includes the indication of the UP IP mode.

8. The method of claim 7, further comprising:

receiving a packet data network connection establishment request from the UE to establish a data bearer with the radio access network;

creating a session with the gateway node to establish the default bearer with the UE; and responsive to establishing the default bearer, sending a message to the long term evolution eNodeB that includes the indication of the UP IP mode supported by the UE.

9. The method of claim 7, wherein receiving the attach request does not include a default radio bearer setup; and further comprising:

sending a message to the long term evolution eNode B to initiate a context setup procedure with the long term evolution eNode B, wherein the message includes providing the UP IP mode of the UE to the long term evolution eNode B.

10. The method of claim 7, further comprising:

establishing a secure packet data network connection with the UE to establish a data radio bearer with the radio access network;

creating a session procedure with a gateway node to establish a default bearer with the UE; and initiating a context setup procedure with the receiving node that includes the indication of the UP IP mode supported by the UE.

11. The method of claim 6, further comprising:

requesting a location update from a core network server;

receiving from the core network server a location update response message that includes subscription data information for the UE as the user plane integrity protection policy;

storing the user plane integrity protection policy in the MME;

deciding that the user plane integrity protection policy takes precedence over the indication of the UP IP mode received in the attach request;

creating a session procedure with the core network to establish a default bearer with the UE; and sending a message to long term evolution eNode B that includes the UP IP mode for the UE and the user plane integrity protection policy.

12. The method of claim 11, further comprising:

sending a message to a source core node that includes the complete attach request;

receiving a response to the message, wherein the response provides the UP IP mode of the UE to the target core node when the attach request is successfully authenticated; and if the attach request was not successfully integrity protected, sending a request to the UE to resend the attach request that includes the indication of the UP IP mode supported by the UE.

13. The method of claim 6, further comprising:

receiving a handover request from a source node;

forwarding (1) the handover request to a source core node and (2) the UP IP mode for the UE if the UP IP mode for the UE is stored in the target core node;

sending a handover command request to a target node, wherein the handover command request includes the UP IP mode if it is stored in the target core node; and sending the UP IP mode to the source node.

14. A method performed by an eNodeB for enabling a user plane integrity protection mode in a New Radio (NR) packet data convergence protocol, PDCP, the method comprising:

receiving a message from a Mobility Management Entity (MME) that includes an indication of a user plane integrity protection, UP IP, mode supported by an E-UTRA-NR Dual Connectivity (EN-DC) capable user equipment with respect to a 4G system, UE; and sending a message to the UE that includes an indication to the UE to activate the UP IP mode for a data radio bearer established between the UE and the eNodeB.

15. The method of claim 14, wherein the receiving comprises:

receiving the UP IP Mode during a security mode command procedure.

16. The method of claim 14, further comprising:

if the UP IP mode is received from the MME, indicating to a new radio access node that the new radio access node should activate the UP IP mode for a data radio bearer established with the UE;

sending a request to the new radio access node for the new radio access node to activate the UP IP mode for the data radio bearer established with the UE;

receiving a response from the new radio access node that indicates that the UP IP mode for the data radio bearer established with the UE will be activated; and initiating a reconfiguration procedure with the UE that includes indicating to the UE to activate the UP IP mode for the data radio bearer established with the new radio access node.

17. The method of claim 14, further comprising:

determining a UP IP mode based on if the radio access node receives a user plane integrity protection policy from the MME that indicates that UP IP mode for the data radio bearer should be activated;

responsive to receipt of the policy indicating that UP IP mode should be activated, activating the UP IP mode for the data radio bearer.

18. An E-UTRA-NR Dual Connectivity (EN-DC) capable user equipment (UE) for enabling a user plane integrity protection mode in a New Radio (NR) packet data convergence protocol, PDCP, the user equipment comprising:

a processor; and a memory coupled to the processor, wherein the memory stores instructions that when executed by the processor causes the processor to perform operations comprising:

providing an indication of a user plane integrity protection, UP IP, mode supported by the UE with respect to a 4G system;

sending an attach request to a Mobility Management Entity (MME) that includes the indication of the UP IP mode supported by the UE; and receiving an activation message from an eNodeB that includes an indication to the UE to activate the UP IP mode for a data radio bearer established between the UE and the eNodeB.

19. An eNodeB for enabling a user plane integrity protection mode in a New Radio (NR) packet data convergence protocol, PDCP, the eNodeB comprising:
   a processor; and
   a memory coupled to the processor, wherein the memory stores instructions that when executed by the processor causes the processor to perform operations comprising:
   receiving a message from a Mobility Management Entity (MME) that includes an indication of a user plane integrity protection, UP IP, mode supported by an E-UTRA-NR Dual Connectivity (EN-DC) capable user equipment with respect to a 4G system, UE; and
   sending a message to the UE that includes an indication to the UE to activate the UP IP mode for a data radio bearer established between the UE and the eNodeB.

20. A Mobility Management Entity (MME) for enabling a user plane integrity protection mode in a New Radio (NR) packet data convergence protocol, PDCP, the MME comprising:
   a processor; and
   a memory coupled to the processor, wherein the memory stores instructions that when executed by the processor causes the processor to perform operations comprising:
   handling an indication of a user plane integrity protection mode supported by an E-UTRA-NR Dual Connectivity (EN-DC) capable user equipment, UE, with respect to a 4G system;
   receiving an attach request from the UE that includes the indication of the UP IP mode supported by the UE;
   responsive to the attach request, establishing a secure connection between the UE and the radio access network; and
   sending a message to a long term evolution eNode B that includes the indication of the UP IP mode.

21. The UE of claim 18, wherein the sending the attach request further comprises sending the attach request that includes a default radio bearer setup; and
   wherein receiving the activation message further includes an indication to the UE to activate the UP IP mode for the data radio bearer established between the UE and the eNodeB.

22. The UE of claim 18, wherein the sending the attach request does not include a default radio bearer setup; and further comprising:
   receiving a message from a receiving node to initiate a security mode procedure with the UE where no data radio bearer with the UE is established.

23. The UE of claim 18, wherein the operations further comprise:
   receiving a handover command from a source radio access node, wherein the handover command includes a command to the UE to activate the UP IP mode for a data radio bearer established with a target radio access node.

24. The UE of claim 18, wherein the operations further comprise:
   receiving a reconfiguration request from a master radio access node, wherein the reconfiguration request includes an indication to the UE to activate the UP IP mode for a data radio bearer established with a secondary radio access node; and
   activating the UP IP mode for the data radio bearer established with the secondary radio access node.

25. The eNodeB of claim 19, wherein the receiving comprises:
   receiving the UP IP Mode during a security mode command procedure.

26. The eNodeB of claim 19, wherein the operations further comprise:
   if the UP IP mode is received from the MME, indicating to a new radio access node that the new radio access node should activate the UP IP mode for a data radio bearer established with the UE;
   sending a request to the new radio access node for the new radio access node to activate the UP IP mode for the data radio bearer established with the UE;
   receiving a response from the new radio access node that indicates that the UP IP mode for the data radio bearer established with the UE will be activated; and
   initiating a reconfiguration procedure with the UE that includes indicating to the UE to activate the UP IP mode for the data radio bearer established with the new radio access node.

27. The eNodeB of claim 19, wherein the operations further comprise:
   determining a UP IP mode based on if the radio access node receives a user plane integrity protection policy from the MME that indicates that UP IP mode for the data radio bearer should be activated;
   responsive to receipt of the policy indicating that UP IP mode should be activated, activating the UP IP mode for the data radio bearer.

28. The MME of claim 20, wherein the handling comprises:
   receiving an attach request that includes the indication of the UP IP mode and includes a default bearer setup;
   responsive to the attach request, establishing a secure connection between the UE and the radio access network; and
   sending a message to long term evolution eNode B that includes the indication of the UP IP mode.

29. The MME of claim 28, wherein the operations further comprise:
   receiving a packet data network connection establishment request from the UE to establish a data bearer with the radio access network;
   creating a session with the gateway node to establish the default bearer with the UE; and
   responsive to establishing the default bearer, sending a message to the long term evolution eNodeB that includes the indication of the UP IP mode supported by the UE.

30. The MME of claim 28, wherein receiving the attach request does not include a default radio bearer setup; and the operations further comprising:
   sending a message to the long term evolution eNode B to initiate a context setup procedure with the long term evolution eNode B, wherein the message includes providing the UP IP mode of the UE to the long term evolution eNode B.

31. The MME of claim 28, the operations further comprising:
   establishing a secure packet data network connection with the UE to establish a data radio bearer with the radio access network;
   creating a session procedure with a gateway node to establish a default bearer with the UE; and initiating a context setup procedure with the receiving node that includes the indication of the UP IP mode supported by the UE.

* * * * *

UNITED STATES PATENT AND TRADEMARK OFFICE
CERTIFICATE OF CORRECTION

PATENT NO. : 12,058,515 B2
APPLICATION NO. : 17/607069
DATED : August 6, 2024
INVENTOR(S) : Wifvesson et al.

Page 1 of 4

It is certified that error appears in the above-identified patent and that said Letters Patent is hereby corrected as shown below:

In the Drawings

In Fig. 4, Sheet 2 of 32, for Tag "5", Line 1, delete "UPIP" and insert -- UP IP --, therefor.

In Fig. 6, Sheet 4 of 32, for Tag "5", Line 1, delete "UPIP" and insert -- UP IP --, therefor.

In Fig. 6, Sheet 4 of 32, for Tag "5", Line 2, delete "UPIP" and insert -- UP IP --, therefor.

In Fig. 6, Sheet 4 of 32, for Tag "5", Line 2, delete "DRB(s)" and insert -- DRB(s)) --, therefor.

In Fig. 7, Sheet 5 of 32, for Tag "5", Line 1, delete "UPIP" and insert -- UP IP --, therefor.

In Fig. 9, Sheet 7 of 32, for Tag "7", Line 1, delete "UPIP" and insert -- UP IP --, therefor.

In Fig. 10, Sheet 8 of 32, for Tag "5", Line 2, delete "policy)" and insert -- policy)) --, therefor.

In Fig. 10, Sheet 8 of 32, for Tag "9", Line 1, delete "UPIP" and insert -- UP IP --, therefor.

In Fig. 10, Sheet 8 of 32, for Tag "9", Line 3, delete "UPIP" and insert -- UP IP --, therefor.

In Fig. 12, Sheet 10 of 32, for Tag "4", Line 2, delete "(activate" and insert -- activate --, therefor.

In Fig. 12, Sheet 10 of 32, for Tag "5", Line 2, delete "(activate" and insert -- activate --, therefor.

In Fig. 12, Sheet 10 of 32, for Tag "6", Line 1, delete "(activate" and insert -- activate --, therefor.

In Fig. 12, Sheet 10 of 32, for Tag "7", Line 1, delete "(activate" and insert -- activate --, therefor.

In Fig. 13, Sheet 11 of 32, for Tag "2", Line 1, delete "(activate" and insert -- activate --, therefor.

Signed and Sealed this
Twenty-second Day of April, 2025

Coke Morgan Stewart
*Acting Director of the United States Patent and Trademark Office*

In Fig. 13, Sheet 11 of 32, for Tag "7", Line 1, delete "(activate" and insert -- activate --, therefor.

In Fig. 14, Sheet 12 of 32, for Tag "2", Line 2, delete "(activate" and insert -- activate --, therefor.

In Fig. 14, Sheet 12 of 32, for Tag "4", Line 2, delete "(activate" and insert -- activate --, therefor.

In Fig. 48, Sheet 24 of 32, for Tag "QQ172", Line 1, delete "Tranceiver" and insert -- Transceiver --, therefor.

In Fig. 48, Sheet 24 of 32, delete "QQ170 Wireless Signal".

In Fig. 48, Sheet 24 of 32, for Tag "QQ116", Line 2, delete "Amplifier(S)" and insert -- Amplifier(s) --, therefor.

In Fig. 48, Sheet 24 of 32, for Tag "QQ118", Line 1, delete "Filter(S)" and insert -- Filter(s) --, therefor.

In Fig. 48, Sheet 24 of 32, for Tag "QQ122", Line 2, delete "Tranceiver" and insert -- Transceiver --, therefor.

In the Specification

In Column 1, Lines 7-8, delete "PCT/EP2020/0561610" and insert -- PCT/EP2020/061610 --, therefor.

In Column 1, Line 25, delete "Management" and insert -- Management Entity --, therefor.

In Column 4, Line 46, delete "may be" and insert -- may --, therefor.

In Column 5, Line 55, delete "disclosure" and insert -- disclosure; --, therefor.

In Column 6, Lines 64-65, delete "interchangeable" and insert -- interchangeably --, therefor.

In Column 7, Line 29, delete "data" and insert -- radio --, therefor.

In Column 7, Line 31, delete "bearer" and insert -- radio bearer --, therefor.

In Column 7, Line 57, delete "Re-15." and insert -- Rel-15. --, therefor.

In Column 7, Line 62, delete "Rel16" and insert -- Rel-16 --, therefor.

In Column 8, Line 9, delete "use" and insert -- user --, therefor.

In Column 8, Line 24, delete "e. g.," and insert -- e.g., --, therefor.

In Column 8, Line 37, delete "may be" and insert -- may --, therefor.

CERTIFICATE OF CORRECTION (continued)
U.S. Pat. No. 12,058,515 B2

In Column 8, Line 59, delete "rate," and insert -- rate; --, therefor.

In Column 9, Line 2, delete "node" and insert -- entity --, therefor.

In Column 12, Line 51, delete "(also" and insert -- also --, therefor.

In Column 13, Line 19, delete "FIG." and insert -- FIGS. --, therefor.

In Column 13, Line 40, delete "FIGS." and insert -- FIG. --, therefor.

In Column 13, Line 47, delete "receiving 2802" and insert -- receiving 2800 --, therefor.

In Column 13, Line 49, delete "creating 2804" and insert -- creating 2802 --, therefor.

In Column 13, Line 52, delete "sending 2806" and insert -- sending 2804 --, therefor.

In Column 15, Line 62, delete "option" and insert -- option to --, therefor.

In Column 21, Line 32, delete "FIGS." and insert -- FIG. --, therefor.

In Column 23, Line 23, delete "the" and insert -- that --, therefor.

In Column 25, Line 62, delete "receiving (2802)" and insert -- receiving (2800) --, therefor.

In Column 25, Line 65, delete "creating (2804)" and insert -- creating (2802) --, therefor.

In Column 25, Line 67, delete "sending (2806)" and insert -- sending (2804) --, therefor.

In Column 26, Line 24, delete "of any of any" and insert -- of any --, therefor.

In Column 29, Lines 31-32, delete "provide." and insert -- provided. --, therefor.

In Column 36, Line 4, delete "circuitry QQ190" and insert -- circuitry QQ192 --, therefor.

In Column 37, Line 14, delete "(VoIP)" and insert -- (VoIP) --, therefor.

In Column 37, Line 21, delete "(CPE)." and insert -- (CPE), --, therefor.

In Column 37, Line 39, delete "etc.)" and insert -- etc.), --, therefor.

In Column 38, Line 9, delete "circuitry QQ114" and insert -- circuitry QQ112 --, therefor.

In Column 40, Line 47, delete "Embodiments" and insert -- Embodiments. --, therefor.

In Column 40, Line 59, delete "UE QQ2200" and insert -- UE QQ200 --, therefor.

CERTIFICATE OF CORRECTION (continued)
U.S. Pat. No. 12,058,515 B2

In Column 41, Line 1, delete "interchangeable." and insert -- interchangeably. --, therefor.

In Column 41, Line 10, delete "source QQ233," and insert -- source QQ213, --, therefor.

In Column 43, Line 55, delete "Embodiments" and insert -- Embodiments. --, therefor.

In Column 44, Line 21, delete "QQ390. Memory QQ390" and insert -- QQ390-1. Memory QQ390-1 --, therefor.

In Column 50, Line 5, delete "according" and insert -- according to --, therefor.

In the Claims

In Column 52, Line 26, in Claim 15, delete "14 ," and insert -- 14, --, therefor.